US012790283B2

(12) United States Patent
Shuttleworth

(10) Patent No.: US 12,790,283 B2
(45) Date of Patent: Nov. 10, 2026

(54) COUPLINGS FOR CONTAINER-BASED COMPOSTING

(71) Applicant: Timothy G. Shuttleworth, Girard, PA (US)

(72) Inventor: Timothy G. Shuttleworth, Girard, PA (US)

( * ) Notice: Subject to any disclaimer, the term of this patent is extended or adjusted under 35 U.S.C. 154(b) by 497 days.

(21) Appl. No.: 18/381,495

(22) Filed: Oct. 18, 2023

(65) Prior Publication Data

US 2024/0124369 A1 Apr. 18, 2024

Related U.S. Application Data

(60) Provisional application No. 63/417,159, filed on Oct. 18, 2022.

(51) Int. Cl.
*C05F 17/979* (2020.01)

(52) U.S. Cl.
CPC .................................. *C05F 17/979* (2020.01)

(58) Field of Classification Search
CPC .............................. C05F 17/979; C12M 29/06
See application file for complete search history.

(56) References Cited

U.S. PATENT DOCUMENTS 4,203,755 A 5/1980 Ruckstuhl
4,521,517 A 6/1985 Gauthier
4,798,801 A 1/1989 Hitzman
5,417,736 A * 5/1995 Meyer .................... C05F 17/00 71/23
5,593,272 A 1/1997 Green
5,597,732 A 1/1997 Bryan-Brown
6,281,001 B1 8/2001 McNelly
6,382,585 B1 5/2002 Pubben
6,383,369 B2 5/2002 Elston
7,833,781 B2 11/2010 Thurot
9,044,795 B2 6/2015 Tyler
(Continued)

FOREIGN PATENT DOCUMENTS

JP 2012144430 A 8/2012

OTHER PUBLICATIONS

Fuchs, John. (Mar. 30, 2012), Reducing Flow vs. Reducing Pressure—Which Is it (Year: 2012).
(Continued)

*Primary Examiner* — Jonathan M Hurst
(74) *Attorney, Agent, or Firm* — K&L Gates LLP

(57) ABSTRACT

Composting systems and methods are disclosed. A composting kit can be removably installed in roll-off waste containers and/or open-topped shipping containers without modifying the container. The composting kit can include a perforated aeration conduit, a flow regulator positioned along the perforated aeration conduit, and/or a delivery conduit fluidically coupled to the perforated aeration conduit at a releasable joint comprising a clearance fit. Additionally, the composting kit can include a blower configured to be fluidically coupled to the delivery conduit. A retraction system can be configured to apply a compressive force to an annular distal face of the perforated aeration conduit to withdraw the perforated aeration conduit while the container is at least partially filled with material, such as compost. The composting system can include a preheating system.

13 Claims, 16 Drawing Sheets

(56) References Cited

U.S. PATENT DOCUMENTS

| | | | | |
|---|---|---|---|---|
| 11,111,188 | B2 | 9/2021 | Shuttleworth | |
| 2007/0261452 | A1* | 11/2007 | Harbert | C05F 17/979 52/302.1 |
| 2012/0021504 | A1 | 1/2012 | Bradlee | |
| 2017/0081252 | A1* | 3/2017 | Bright | C05F 17/979 |
| 2019/0119180 | A1* | 4/2019 | Shuttleworth | C05F 17/914 |

OTHER PUBLICATIONS

Machine Description Translation of JP2012144430A (Year: 2012).
The Process Piping Document (Year: 2017).

* cited by examiner

COUPLINGS FOR CONTAINER-BASED COMPOSTING

CROSS-REFERENCE TO RELATED APPLICATIONS

The present application claims the benefit of priority under 35 U.S.C. § 119(e) to U.S. Provisional Application No. 63/417,159, entitled "COUPLINGS FOR CONTAINER-BASED COMPOSTING", filed on Oct. 18, 2022, which is incorporated by reference herein in its entirety.

BACKGROUND

Composting systems and methods can be employed in various environments and in operations of varying scale. For example, individuals can compost material in their homes and large entities can compost material at commercial composting sites. Farms often have large volumes of raw, compostable material, such as manure, which can amass in exposed piles. Such piles can be unsightly, foul smelling, attractive to pests, and/or problematic to nearby environments and ecosystems. Additionally, run-off or leaching from these exposed piles may flow into nearby bodies of waters, which may contaminate a water source and/or violate one or more environmental regulations. Despite the negative consequences from storing raw, non-composted material, composting the material may not be cost-effective because composting equipment and services can be expensive, time-consuming, labor-intensive, and/or impractical in certain instances.

FIGURES

Various features of the embodiments described herein, together with advantages thereof, may be understood in accordance with the following description taken in conjunction with the accompanying drawings as follows.

Corresponding reference characters indicate corresponding parts throughout the several views. The exemplifications set out herein illustrate various embodiments of the invention, in one form, and such exemplifications are not to be construed as limiting the scope of the invention in any manner.

DESCRIPTION

Figure 1:
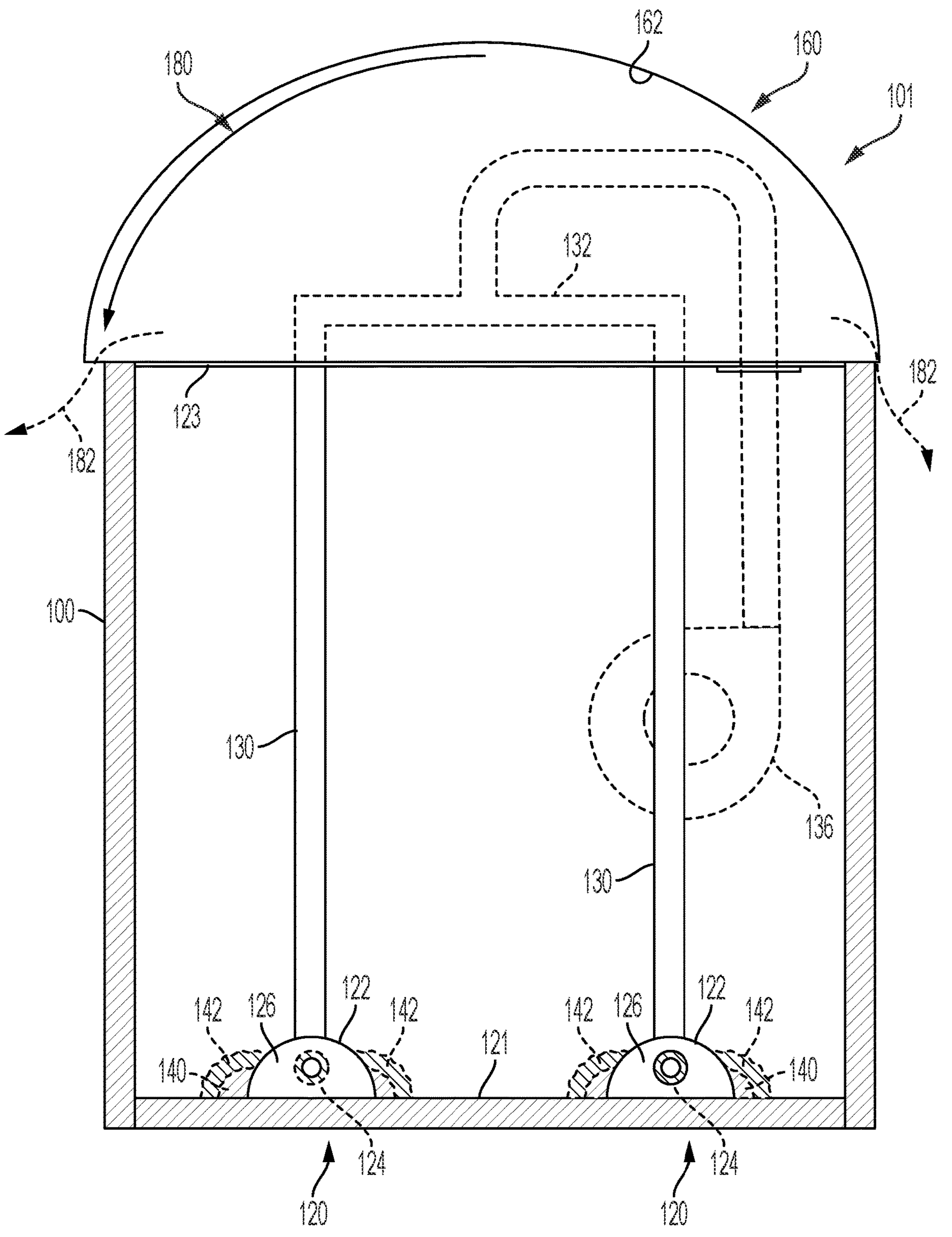
FIG. 1 is a cross-sectional end view of a composting system, according to various aspects of the present disclosure.

Composting is a natural process whereby oxygen and water permit natural organisms to decay organic material. This decayed organic material has many desirable attributes compared to the pre-composted raw material. However, various composting methods can require frequent injections of effort by an operator on a daily basis or even more frequently. For example, in a "turned pile" composting method, a pile of raw organic material is periodically "turned" to introduce oxygen and break-up the material. In smaller batches, the pile can be turned by a farmer with a pitchfork. In larger batches, a tractor with a front-end bucket can turn the pile. Commercial operations can utilize one or more purpose-built windrow turning machines. Such turned pile methods can be labor-intensive and slow often requiring many weeks or even months to complete the composting cycle.

To accelerate the composting cycle, blowers, controls, and air distribution systems can be utilized to inject oxygen into the organic matter. This can be referred to as an Aerated Static Pile (ASP) method. In certain instances, doses of oxygen can be provided based on a process metric, such as the temperature of the pile. ASP methods may complete a composting cycle in four to five weeks or even as little as two to three weeks, followed by a curing period. Either way, the ASP method can be completed in a fraction of the time (or even an order of magnitude faster) in comparison to the turned pile method. Many rapid processes also involve using smaller, more homogenized pieces of raw material, controlling the carbon-to-nitrogen ratio (e.g. to 30-to-1 or less), and/or careful monitoring of the moisture level and temperature(s) of the process.

The bacterial activity in rapid composting methods, such as an ASP method, can generate high temperatures of approximately 130-140° F., for example, which can break down the material, and/or destroy pathogens and/or seeds. The raw material/original feedstock can be unrecognizable after the composting process is complete. At this stage, the compost can be used to prepare fields or other planting areas; however, many professionals recommend that the compost be given time to cure before using in a nursery for starting seeds or growing young plants. The curing time allows fungi to continue the decomposition process and eliminates phytotoxic substances.

In certain instances, ASP methods can be conducted in a container or vessel, which is referred to as in-vessel composting. For example, in vessel composting has defined dimensions (e.g. X-, Y-, and Z-boundaries) defined by the vessel. In such instances, more precise aeration control can be implemented. These ASP methods can require significant capital cost, especially the vessel and/or facility expense. Alternatively, when ASP is deployed on open ground, the process control can suffer and/or unmitigated environmental issues can arise. It is desirable to compost material economically, without requiring frequent efforts by an operator and/or while safe guarding the environment.

In one general aspect, various types of material can be composted using pressurized air. For example, the ASP method can be employed. Material that is added to a composting system and/or treated during a composting cycle can be referred to as "raw material." Raw material can include organic solid waste (i.e., green waste), human waste, and animal manure and bedding, such as straw, sawdust, paper and cardboard, for example. Green waste can be balanced with brown waste to improve and expedite the composting process. For example, waste food raw material, i.e. "greens" can be combined with used animal bedding, i.e. "browns" to speed up the composting process. Upon completion of the composting cycle, the material that is removed from the composting apparatus can be referred to as "compost." In certain instances, the compost can be subjected to a lower temperature curing step before the compost is finished or seasoned for use.

In various instances, raw material can be composted in a standard container, such as a common, commercially-available roll-off waste container, dumpster, or open-top intermodal shipping container. The container can be a substantially rectangular container having walls, a floor, at least one operative door, and an open top. The open top can be covered with a reusable, removable, breathable cover, as further described herein. The cover can protect the container from natural elements like rain and snow while still permitting the discharge of excessive moisture, for example. Roll-off waste containers, or similar containers, are used extensively in the waste management industry and intermodal containers are used extensively in the transportation industry and, thus, can often be obtained at a relatively low-cost. Moreover, as further described herein, such containers can be utilized for composting without permanent modifications thereto, which can be economically advantageous. The reader will readily appreciate that various alternative containers, including different commercially available containers, can also be suitable.

Figure 9:
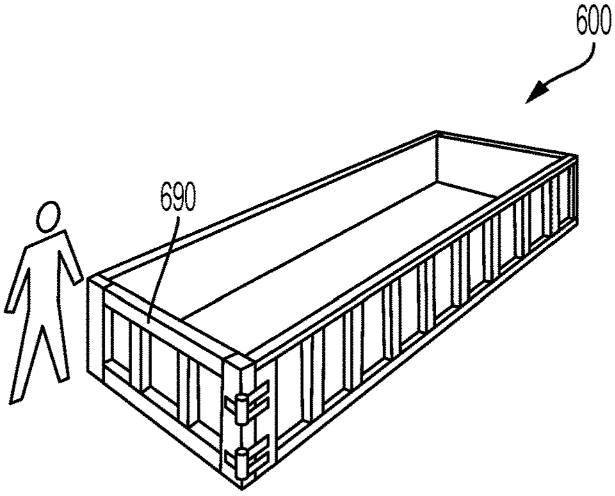
FIG. 9 is a perspective view of a 20-yard open-top roll-off container, according to various aspects of the present disclosure.
Figure 10:
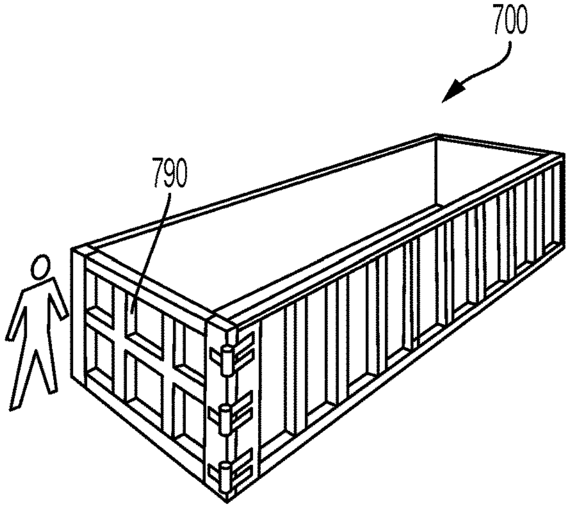
FIG. 10 is a perspective view of a 30-yard open-top roll-off container, according to various aspects of the present disclosure.
Figure 11:
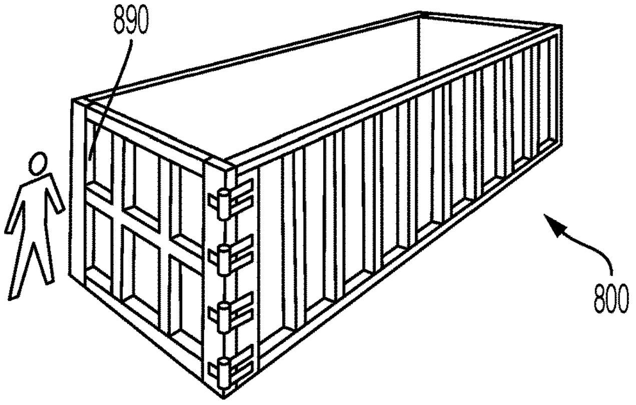
FIG. 11 is a perspective view of a 40-yard open-top roll-off container, according to various aspects of the present disclosure.

Exemplary open-top roll-off containers are shown in FIGS. 9-11. For example, FIG. 9 depicts a 20 cubic-yard container 600, FIG. 10 depicts a 30 cubic-yard container 700, and FIG. 11 depicts a 40-cubic yard container 800. In at least one aspect, the dimensions of the container 600 are 4 feet tall, 8 feet wide, and 22 feet long. In at least one aspect, the dimensions of the container 700 are 6.5 feet tall, 8 feet wide, and 22 feet long. In at least one aspect, the dimensions of the container 800 are 8 feet tall, 8 feet wide, and 22 feet long. The containers 600, 700, and 800 can be utilized in the various composting systems and methods disclosed herein. Each container 600, 700, and 800 includes a floor, four sides, and an open top. A door 690, 790, 890 is positioned on one of the four sides for each container 600, 700, and 800, respectively. The doors 690, 790, and 890 form one entire side of each container 600, 700, and 800, respectively. In other instances, the doors 690, 790, and/or 890 can form a portion of a side wall. The doors 690, 790, and 890 open along lateral hinges; however, other door opening arrangements (e.g. sliding, folding, etc.) are envisioned. In at least one aspect, the containers 600, 700, and 800 are 22 feet long and 8 feet wide. The height of each container is different, which accounts for the variations in volume. Owing to the standard footprint and geometry of the containers 600, 700, and 800, they are configured to be loaded onto a truck for transportation. The reader will readily appreciate that alternative container geometries can also be utilized. For example, dumpsters and intermodal shipping containers can define standard sizes, which can accommodate various composting systems disclosed herein. For example, a container or vessel for container-based composting can be commercial-available dumpster.

In certain instances, aeration of raw material that is loaded into a container can be provided by a ductwork system including conduits, pipes, tubes, or ducts that enter the container through the open-top and are arranged along a solid floor of the container. The ductwork system can be installed and maintained in position without modifying the container. For example, the solid walls and the floor, or bottom surface, of the containers 600, 700, and 800 (FIGS. 9-11) can remain unchanged, e.g., free of additional screw holes, slits, or other openings. In certain instances, the container can be rented or leased. In such instances, modifying the container may be prohibited by the lessor. Additionally, a modified container can be difficult to return to a conventional waste management or transportation application because any modifications thereto must be undone and may undermine the integrity of the container. However, unmodified containers can be returned to conventional non-composting uses after being used in a composting system for days, weeks, months or even years and, thus, retain their asset value as waste management containers (e.g. dumpsters) and/or shipping containers, for example. Similarly, when other standard-size containers are utilized in the composting system described herein, the containers can be returned to their pre-composting use such as for collecting refuse, shipping and/or storing goods, for example.

In various instances, an aeration system of a composting system can be removed from the container while the container is loaded with compost. As a result, the loaded container can be transported as conventional roll-off waste containers, such as by a roll-off truck, to relocate the compost to a suitable buyer and/or end-user, for example. Moreover, the removed aeration system can be installed in another container to begin a subsequent composting cycle. In such instances, the container can easily alternate or transition between a composting function and a non-composting function, such as storage and/or transportation, for example. Additionally, at least a portion of a composting cycle can occur during a storage and/or transportation step, as well.

Figure 2:
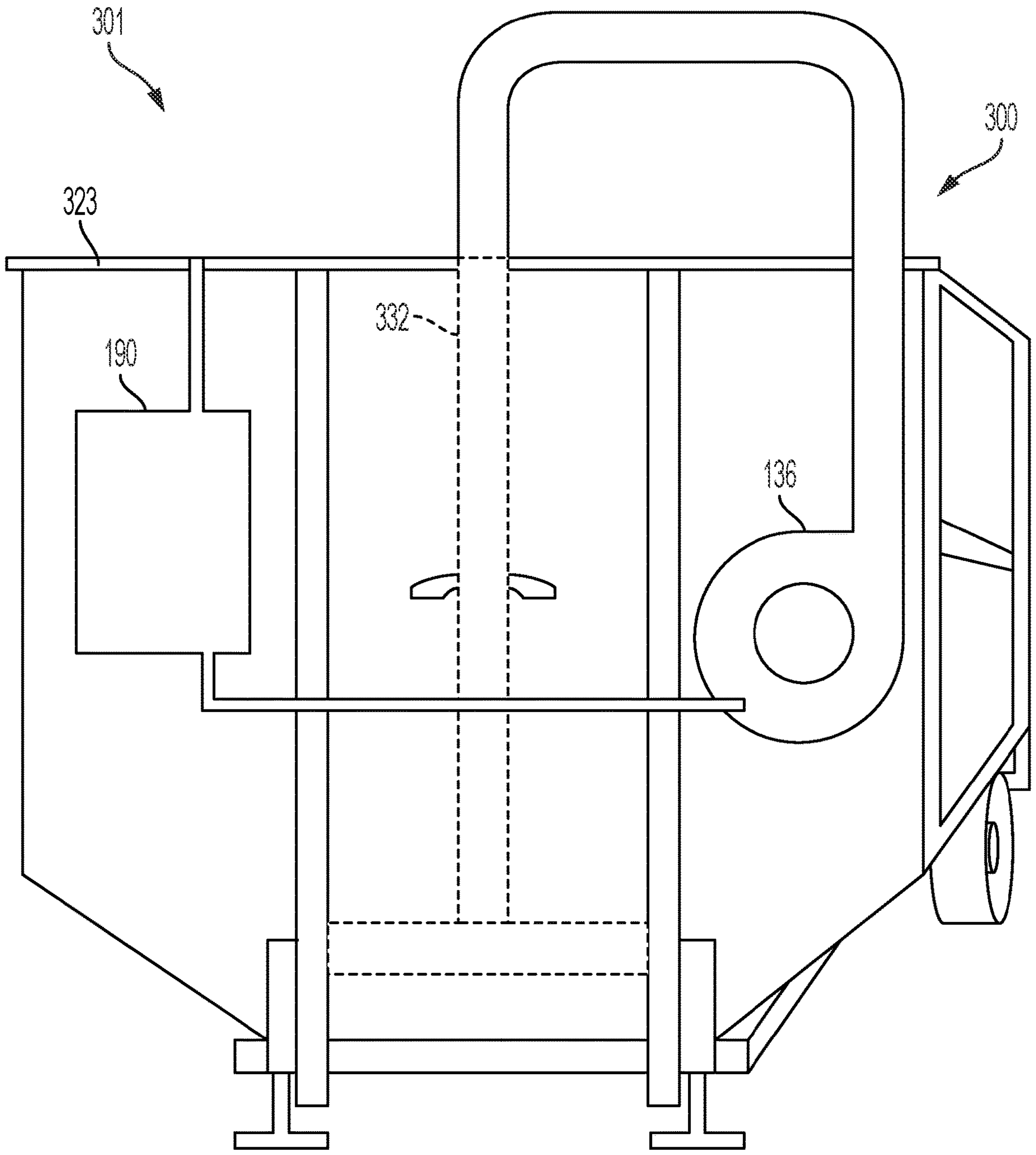
FIG. 2 is an end view of a composting system, wherein certain internal components are depicted with phantom lines for illustrative purposes, according to various aspects of the present disclosure.
Figure 6:
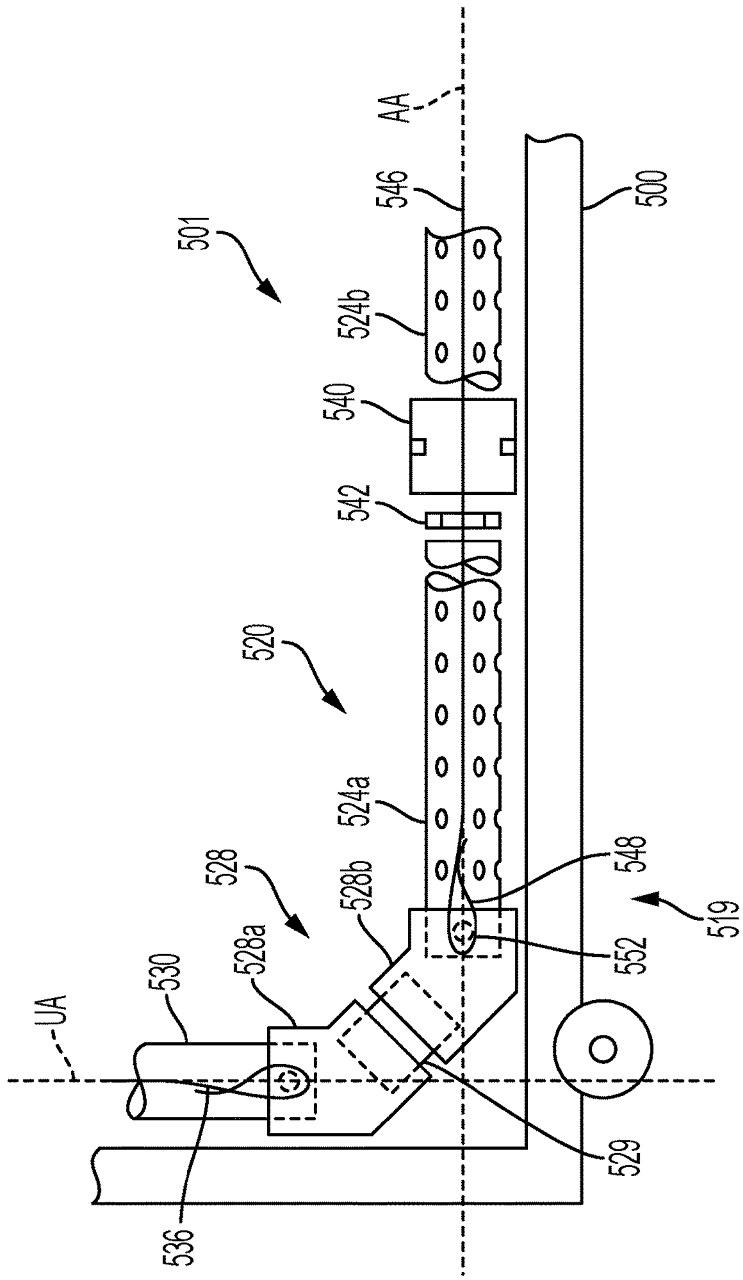
FIG. 6 is a partially-exploded side view of a portion of the aeration distributor of FIG. 5 positioned in a roll-off container, in which several hidden internal components are shown for illustrative purposes, according to various aspects of the present disclosure.
Figure 7:
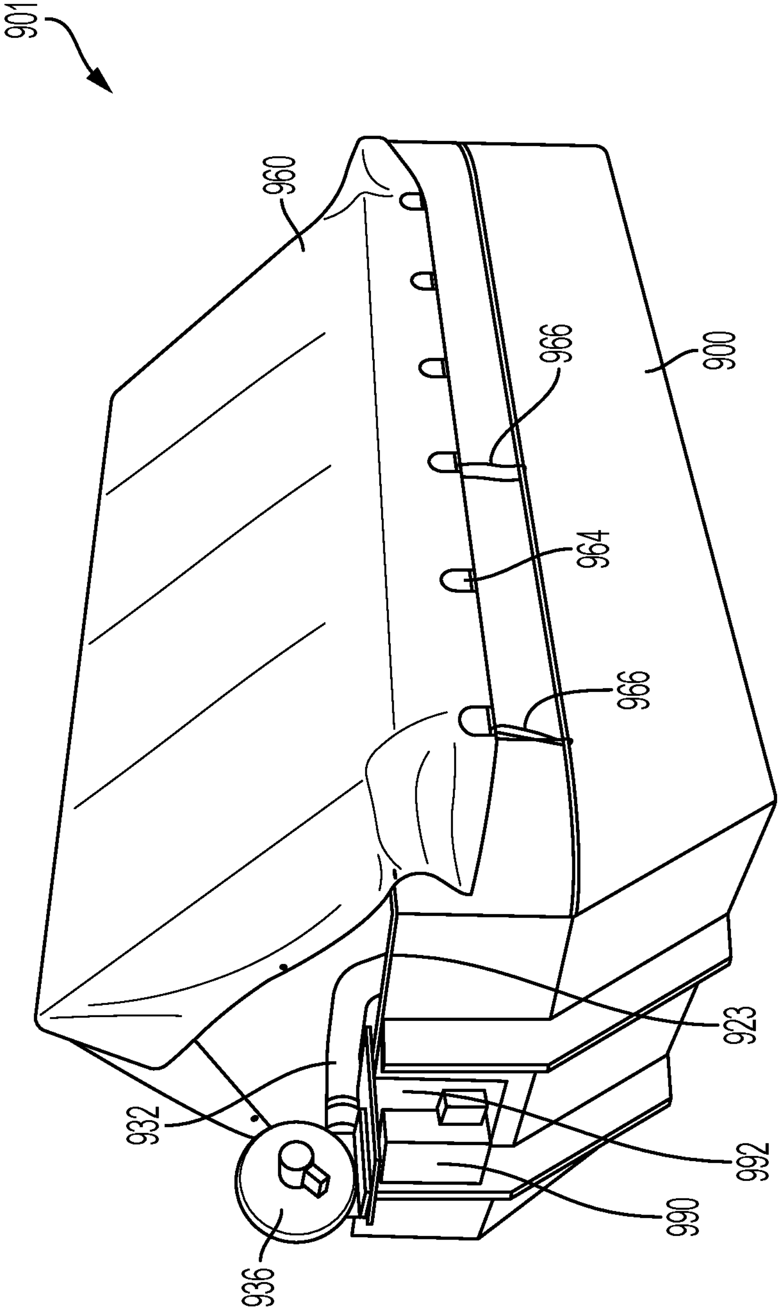
FIG. 7 is a perspective view of a composting system, according to various aspects of the present disclosure.

A schematic of an exemplary composting system 101 according to various embodiments of the present invention is depicted in FIG. 1. The composting system 101 includes a container 100, which may be a standard, roll-off waste container. The container 100 can be a 10 yard, 15 yard, 20 yard, 30 yard or 40 yard dumpster, for example. In other instances, the container 100 can be an open-top intermodal shipping container. For example, the shipping container can be an 80 yard container. The reader will appreciate that various alternative open-top containers and/or sizes thereof can be used. Such containers are readily available and compatible with existing transportation systems such as roll-off trucks, trains, and/or forklifts, for example. The container 100 can be similar to the containers 600, 700, and 800 (FIGS. 9-11), for example. Exemplary containers are also depicted in FIGS. 2, 6, and 7, for example.

The container 100 is open on the top and includes an operative door at one end. Aeration distributors 120 are installed in the container 100 without modifying the container 100. In certain instances, the aeration distributors 120 and/or portions thereof can be pre-assembled and then placed along a bottom surface 121 of the container 100. The aeration distributors 120 are tube-in-tunnel distributors. In other words, the aeration distributors 120 include an inner tube 124 positioned between a barrier tube 122 and the bottom surface 121 of the container 100. The barrier tube 122 and the container 100 can form a plenum or chamber in which the inner tube 124 resides. In other instances, the aeration distributors 120 may not include the barrier tube 122. Alternative aeration distributors are described herein.

As depicted in FIG. 1, a pair of aeration distributors 120 extend in parallel along the bottom surface 121 of the container 100 into/out off the page as shown in FIG. 1. In other instances, more than two aeration distributors 120 can be positioned along the bottom surface 121 of the container 100. In still other instances, a single aeration distributor 120 can be positioned along the bottom surface 121 of the container 100. The aeration distributors 120 can be manufactured from commercially-available materials, as described under the heading "Example Aeration Distributor" herein. Moreover, the aeration distributors 120 can be durable and, thus, can be reusable for multiple composting cycles.

Each aeration distributor 120 includes the inner tube 124 (also extending into/out of the page for FIG. 1), which is a perforated conduit. Perforations or holes in the inner tube 124 are spaced along the length thereof. The inner tube 124 can be held within the barrier tube 122 by semi-circular buttresses 126 at one of more locations along the length of the inner tube 124. For example, buttresses 126 can be positioned on opposing ends of the inner tube 124. A first end of the inner tube 124 is coupled to an elbow fitting and the opposite end of the inner tube 124 is capped with an end cap.

The aeration distributors 120 are coupled to delivery pipes 130, or upright pipes, that exit the container 100 along the top edge 123 on one of the four sides. The upright pipes 130 are connected to the elbow fittings and extend upward toward a manifold 132. The manifold 132 is connected to a blower 136. The manifold 132 can consist of standard ductwork components, for example. Referring still to FIG. 1, the blower 136 is mounted on the end of the container 100 opposite the operative door. For example, the blower 136 can be suspended by a hook extending over the top edge 123 of the container 100, and the hook can be held in place by gravity. The reader will readily appreciate that the blower 136 can be mounted on any suitable side of the container 100 and the manifold 132 can be modified and/or moved to fluidically couple the upright pipes 130 to the blower 136. For example, the blower 136 can be positioned on the end of the container 100 having the door therein. In FIG. 1, the manifold 132 includes a horizontal pipe extending between the two upright pipes 130 above the top edge 123 of the container 100. The manifold 132 can be removed without unloading the loaded material (e.g. raw organic material and/or compost). The manifold 132 includes a tee having a pair of outlets. In such instances, the manifold 132 can bifurcate the air supplied by the blower 136. In other instances, a manifold can direct the air toward one or more additional aeration conduits.

The blower 136 can be a 1.5 HP, 1200 Watt blower, for example. It may have a discharge velocity to atmosphere (no resistance) of approximately 5000 feet/minute from the center of a 4-inch diameter outlet, which can correspond to between 400 and 500 cubic-feet/minute to atmosphere. At static pressure (100% resistance), it can develop approximately 7.5 inches of pressure in a water column, which is about 0.27 pounds/square-inch. In other instances, a 2.0 HP or larger blower can be utilized. For example, a 1.5 HP, 1200 Watt blower is suitable for a 10-yard container; however, a more powerful blower can be utilized with a larger container (e.g. a 20-yard container) and/or when utilized with more than one container/composting system. For example, a single blower can be coupled to multiple composting systems. Alternatively, a 1.5 HP, 1200 Watt blower can be utilized for a larger load; however, the duty cycle may increase and/or the composting cycle may require more time. In other instances, the blower for a composting kit can include a compressor or a fan, for example. A power cord can supply power to the blower 136. For example, an outdoor extension cord can extend between a 15-amp or 20-amp circuit and the blower 136. The foregoing specifications are exemplary and non-limiting. The reader will appreciate that alternative blowers and associated features can be implemented in various aspects of the present disclosure.

In FIG. 2, an alternative composting system 301 is depicted. The composting system 301 can be similar in many respects to the composting system 101 (FIG. 1). For example, the composting system can include a pair of aeration conduits extending parallel to the longitudinal axis of a container 300. The container 300 can be similar to the containers 600, 700, and 800 (FIGS. 9-11), for example. Exemplary containers are also depicted in FIGS. 1, 6, and 7, for example. The aeration conduits can be fluidically coupled to the blower 136 by a manifold 332. The horizontal pipe of the manifold 332 extending between the aeration conduits is positioned below a top edge 323 of the container 300. In such instances, the horizontal pipe may be covered with raw material and/or compost and removing at least a portion of the loaded material may be necessary before the manifold 332 can be removed from the container 300.

Referring again to FIG. 1, a delivery conduit, or upright pipe, 130 extends vertically or substantially vertically from the respective elbow fitting. The elbow fitting can be two 45-degree elbows to form a 90-degree turn, for example, and the upright pipe 130 can securely fit or nest with the elbow fitting. The elbow fitting can include a non-interference fit, or clearance fit, which can permit quick release and/or separation of the components when an upward force is applied to the upright pipe 130. In certain instances, the 45-degree to 45-degree fitting can be press-fit or friction-fit, for example, and/or may be taped to permit the upright pipe 130 to disengage the elbow fitting and be lifted out of the container 100 with ease and without substantially emptying the loaded contents in the container 100. In other instances, the elbow fitting can be a 90-degree elbow conduit. The upright pipe 130 can be removed from the container 100 even when the elbow fitting is inaccessible, e.g., buried under raw material and/or compost within the container 100. As further described herein, after the upright pipe 130 has been withdrawn along an upright axis, the aeration distributor 120 can be pulled horizontally through an opened door of the container 100 thereby withdrawing the aeration distributor 120 without removing the compost in the container 100.

The aeration distributors 120 can be held in place within the container 100 by gravity alone. In other words, the unmodified container 100 can hold the aeration distributors 120 in place. After the aeration distributors 120 are laid into the unmodified empty container 100, wood chips 140 and/or wood shavings 142 can be added to the container 100. For example, wood chips 140 can form a first layer on the bottom surface of the container 100, and wood shaving 142 can form a second layer on the wood chips 140. The container 100 can then be ready to receive the raw material. In addition to raw material, moisture can be added to ensure the container 100 includes an ideal feed composition.

The raw material can be mounded slightly and still fit under a removable cover or roof 160. The cover 160 provides a breathable cover for enclosing the entire container 100. The cover 160 can be comprised of a water-proof tarp and frame members. For example, longitudinal frame members can extend along opposing lengths of the tarp and flexible pipes or supports can extend across the tarp between the opposing longitudinal frame members. The flexible pipes can bend to form an arc between the opposing longitudinal frame members. In certain instances, the edges of the tarp can include grommet holes adjacent to the longitudinal frame members. Elastic cords can engage the grommet holes to pull the edges of the tarp toward the ground on opposite sides and/or ends of the container 100. Alternative covers are further described herein. Such covers can be removably secured to the to containers without modifying the container.

Referring still to FIG. 1, the cover 160 includes an inside surface 162, which can correspond to the underside of the tarp. The inside surface 162 can define an arced profile, for example. During a composting cycle, water droplets or condensation 180 can form on the inside surface 162. The surface tension of the condensation 180 and the profile of the inside surface 162 can direct the condensation 180 to "roll" toward the edges of the cover 160. Referring still to FIG. 1, the edges of the cover 160 are configured to overhang the perimeter of the container 100 such that the condensation 180 is discharged beyond the perimeter of the container 100. In other words, the breathable cover 160 can provide an escape path 182 for air and water. Another cover 960 is depicted in FIG. 7 and, in various instances, the cover 960 can be incorporated into the composting system 101 (FIG. 1) and, in certain instances, the cover 160 (FIG. 1) can be incorporated into the composting system 901 (FIG. 7).

The blower 136 can be periodically-activated to circulate a gas, such as air, through the aeration distributors 120 to maintain an aerobic condition within the container 100. In particular, the blower 136 can direct air into the manifold 132, through the upright pipes 130, and into the inner pipes 124 of the aeration distributors 120. In various instances, the blower 136 can be activated by a timer for a few seconds each half-hour or each hour, for example. For example, the duty cycle for the blower can be 1%-10%. In certain instances, the temperature of the compost within the container 100 can be monitored by one or more temperature sensor(s) placed at various locations within the container 100 to ensure an appropriate temperature is maintained. Activation of the blower 136 can be a function of the detected temperature.

Composting of raw material can require a few weeks of time and, during that time, no additional labor or work may be required of the operator. In certain instances, the composting system 101 can include a control panel (such as the control panel 190 in FIG. 2 and the control panel 990 in FIG. 7), which can be configured to communicate information to an operator and/or receive inputs from an operator via a user interface, such as a touchpad control screen. Such a control panel can be releasably attached to the container 100, as further described herein.

Referring primarily now to FIG. 2, the control panel 190 for the composting system 301 can be suspended by a hook extending over the top edge 323 of the container 300, and the hook can be held in place by gravity, for example. The control panel 190 can allow the operator to initiate and/or terminate a composting cycle, manually operate the blower 136, and/or input information such as the type and/or fullness level of the container 300. For example, the control panel 190 can be communicatively coupled to the blower 136. In one aspect, when the container 300 has been loaded with raw material, the user can provide inputs to the control panel 190 to initiate the composting cycle. In certain instances, the duration of the composting cycle and the duration and frequency of the blower's activation period can be a function of the information input into the control panel 190. The control panel 190 can further permit the user to modify the composting cycle and/or further activate the blower 136.

Additionally, or alternatively, the control panel 190 can display the temperature(s) detected within the container 300, the outside temperature, the length of the composting cycle, and/or the estimated completion time. In various instances, the control panel 190 can include a processor-based control unit, such as a microcontroller or microprocessor, which can be in signal communication with a remote computing device (i.e., remote from the container 300). The control unit can be in communication with the remote computing device via a communication network (e.g., the Internet, a LAN, Ethernet, etc.) using wired or wireless (e.g., WiFi) communication links. In such instances, the control unit can convey information to and/or from the remote computing device. An operator at the remote computing device may be able to monitor and/or effect changes to the composting cycle via inputs to the remote computing device and/or may receive alerts and/or updates regarding the composting cycle from the control unit. For example, an operator can interact with the composting system via an application on a smart phone.

Referring again to FIG. 1, when the composting cycle is complete, the composting system 101 can be disassembled. For example, the blower 136 can be disconnected from the manifold 132 and/or the manifold 132 can be disconnected from the upright pipes 130. When disconnected, the blower 136, even when activated, cannot provide air to the aeration distributors 120. The upright pipes 130 exiting the compost at the top of the container 100 can be pulled free of the connection at the elbow fitting. For example, the upright pipes 130 can be extracted along vertical or upright axes extending through the upright pipes 130. In various instances, the upright pipes 130 can be extracted with an extraction cable system, as further described herein. In other instances, such as where the upright pipes 130 and blower are positioned at the end of the container 100 defining the door, an extraction system may not be incorporated into the system. For example, the door can open upon completion of the composting cycle during the unloading phase and the vertical pipe (with the blower attached in certain instances) can be pulled up and out of the composted material by hand.

Moreover, in various instances, the pre-assembled tube-in-tunnel aeration distributor 120 can be removed without unloading the finished compost. For example, the door to the container 100 can be opened, which can reveal one end of each tube-in-tunnel aeration distributor 120. For example, the central opening of each inner tube 124 can define a longitudinal axis that is aligned with the doorway of the container such that the aeration distributors 120 can be withdrawn through the doorway along the respective longitudinal axes. For example, the longitudinal axis can extend through the open doorway, and when the door is closed, the longitudinal axis can be oriented perpendicular to the inside surface of the door. The exposed proximal end of the aeration distributor 120 can be connected to a tractor or other suitable equipment by a chain, cable, or strap and pulled lengthwise free from the bulk volume above. The entire aeration distributor 120, including the barrier tube 122, inner tube 124 and buttress 126 can be removed from the container 100. After the aeration distributors 120 have been removed, the container door can be closed.

Incidental compost may be discharged during extraction of the aeration distributors 120. The discharged compost can be replaced on top of the volume of compost within the container 100. After the cover 160 is removed, the compost is sitting in a usual roll-off container ready for pick-up and delivery. No additional material handling is required other than delivery and emptying of the container 100. Once the container 100 has been delivered and emptied, the container 100 is available immediately for reuse in another composting cycle or can be returned to its original, non-composting use. Composting methods and cycling of multi-purpose containers, such as the container 100, is further described herein.

Figure 3:
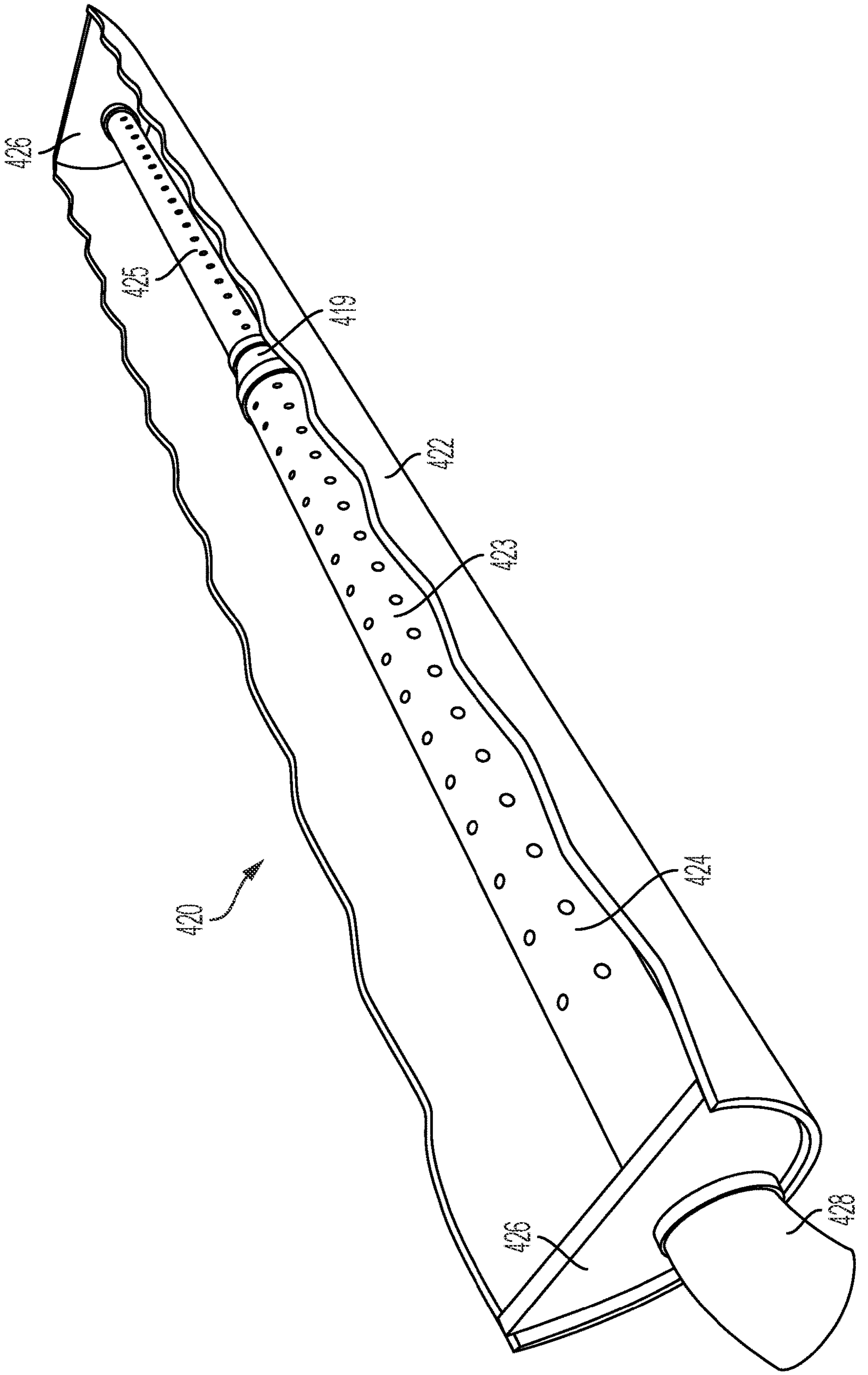
FIG. 3 is a perspective view of an aeration distributor for a composting system, according to various aspects of the present disclosure.
Figure 4:
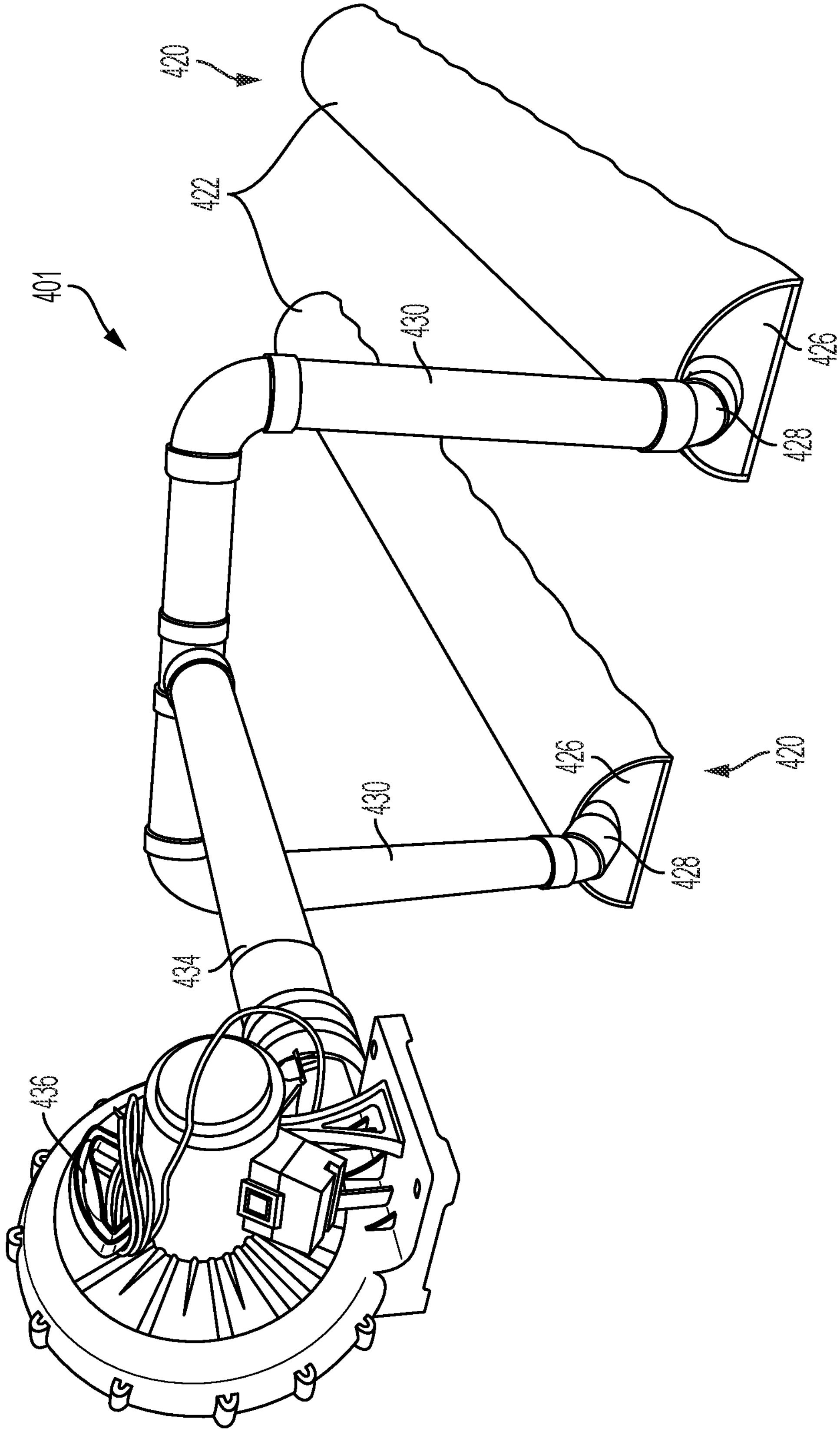
FIG. 4 is perspective view of a composting kit including the aeration distributor of FIG. 3, according to various aspects of the present disclosure.

Referring primarily now to FIGS. 3 and 4, various components of a composting system 401 are shown. In various instances, the components in FIGS. 3 and 4 can be utilized in the composting system 101 in FIG. 1 or the composting system 301 in FIG. 2. An aeration distributor 420 is depicted in an upside-down configuration in FIG. 3 to expose an inner tube 424 positioned within a barrier tube 422. The aeration distributor 420 defines a tapered geometry and a laterally-varying spacing between perforations, as further described in U.S. Pat. No. 11,111,188, titled CONTAINER-BASED COMPOSTING, which issued Sep. 7, 2021.

Referring primarily to FIG. 4, the composting system 401 includes a pair of aeration distributors 420 arranged in parallel. The aeration distributors 420 are coupled to upright pipes 430 that are configured to exit a container, such as the container 100 in FIG. 1, for example, along a top edge of one of the four sides. The upright pipes 430 are connected to the elbow fittings 428 and extend upward toward a manifold 432. The manifold 432 is connected to a blower 436 such that a fluid pathway is provided from the blower 436 to the inner tubes 424 (FIG. 3). The blower 436 can be similar to the blower 136 (FIGS. 1 and 2) in many respects.

Due to the length of stand-size containers, multiple conduits may be assembled together to form an aeration conduit. Because air is compressible, it can be compressed at the far end (the distal capped end) of the aeration conduit and, thus, a greater volume of air can exit the aeration conduit toward the far end in comparison to the near end (the proximal end). For example, air can simply flow past the more-proximal perforations and exit through the more-distal perforations where the air is more compressed adjacent to the distal end cap past which the air cannot flow. To improve air distribution along the aeration conduit, flow regulators can be positioned along the length thereof. For example, restricting orifices can be provided along the length of the aeration conduit. Restricting orifices have a smaller inner diameter than the inner diameter of the conduit portions. In instances in which multiple conduits have been combined to form the aeration conduit, the restricting orifices can be installed between adjacent conduit portions.

The multiple conduit segments can be coupled together with conduit couplers. For example a coupler fitting can be positioned between adjacent conduit segments. The joints along the length of the aeration conduit (e.g., the joint between a coupler fitting and a conduit segment) can form potential failure points. For example, when a retraction force is applied to the aeration conduit to withdraw the aeration conduit from under a load of compost in the container, the aeration conduit can be prone to separation at one or more joints. In various instances, a retraction assembly can be used to hold the components of the aeration conduit together during the retraction step. The retraction assembly can include a cable that extends along at least a substantial portion of the aeration conduit. For example, the cable can extend from the distal end cap though each restrictive orifice, coupling, and perforated pipe segment to the proximal end of the of the aeration conduit. During retraction, the end of the cable, or a connector thereon, can be accessible and pulled upon to withdraw the entire aeration conduit. A first tensile or pulling force can compress the aeration assembly and ensure the components are tightly or snugly coupled together. A second, greater tensile or pulling force on the cable can pull the aeration conduit from the container. Because the aeration conduit can be comprised of PVC pipe and have a higher compressive strength (pounds force applied before failure) than tensile strength, the retraction assembly can improve the strength of the aeration conduit. Additionally, as the cable is pulled, it can become taut and straight and, as a result, the various components forming the aeration conduit can straighten along the axis thereof, which may experience less resistance as the aeration conduit is withdrawn along the axis.

Figure 5:
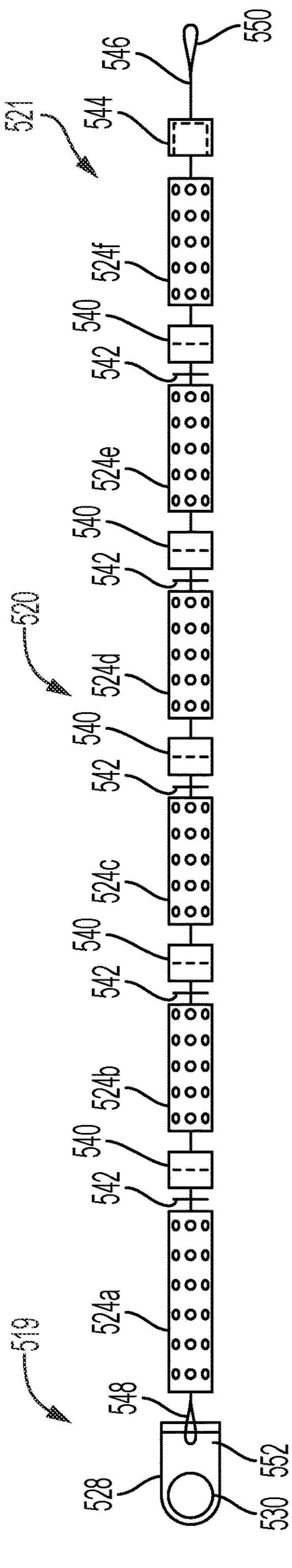
FIG. 5 is an exploded top view an aeration distributor, according to various aspects of the present disclosure.

An example aeration conduit 520 is shown in FIGS. 5 and 6. The aeration conduit 520 is positioned in a roll-off container 500 in FIG. 6. The container 500 can be similar to the containers 600, 700, and 800 (FIGS. 9-11), for example. Exemplary containers are also depicted in FIGS. 1, 2, and 7, for example. The aeration conduit 520 can be combined with other components of a composting kit to form a composting system 501. For example, the aeration conduit 520 can be fluidically coupled to the blower 136 (FIGS. 1 and 2) and positioned along the bottom surface of the container 500. The aeration conduit 520 is formed from multiple conduit segments **524*a*, 524*b*, 524*c*, 524*d*, 524*e*, and 524*f* which are coupled together at coupler fittings 540. For example, a coupler fitting 540 can be positioned between a first segment 524*a*, or proximal-most segment, and a second conduit segment 524*b*. The joints between the conduit segments 524*a*, 524*b*, 524*c*, 524*d*, 524*e*, and 524*f* can each be configured to accommodate flow regulators, such as restrictive orifices 542. The restrictive orifices 542 can define an opening or aperture that is smaller than the diameter of the adjacent conduit segments. In such instances, the restrictive orifices 542 can control the flow of air through the aeration conduit 520. In various instances, one or more restrictive orifices 542 can be inserted or received in the respective coupler fitting 540. In FIGS. 5 and 6, a restrictive orifice is positioned between each adjacent conduit segment. In other instances, certain segment joints may not include a restrictive orifice. Additionally or alternatively, one or more alternative flow regulators (e.g. different patterns of perforations and/or diameter-changing fittings) can be incorporated into the aeration conduit 520**.

A cable 546 extends through the aeration conduit 520 from a proximal end 519 to a distal end 521 of the aeration conduit 520. The cable 546 can be a quarter-inch diameter steel cable, for example. In other instances, larger diameter cables can be utilized. For example, a ⅜-inch or ½-inch diameter cable can be employed. In various instances, the diameter of the cable can be less than ¾-inch or less than one inch, for example. The cable 546 includes a fixed end 548, which is anchored to the aeration conduit 520, and a free end 550. The fixed end 548 of the cable 546 is secured to a bar 552 extending through the aeration conduit 520. The bar 552 can be a metal pipe, for example, that extends through the aeration conduit 520 between the elbow joint 528 and the proximal-most conduit segment 524*a*, for example. A loop of cable 546 at the fixed end 548 can be formed with a cable clamp, for example, and the bar 552 can be retained within the loop of cable 546. The free end 550 of the cable 546 forms a connector, e.g. another loop of cable 546 formed with a cable clamp, for example. Between the fixed end 548 and the free end 550, the cable 546 extends through each restrictive orifice 542, coupler fitting 540, perforated conduit segment 524, and a distal end cap 544 of the aeration conduit 520.

The aeration conduit 520 can be utilized in the various composting methods described herein. In one aspect, a composting method can include positioning one or more of the aeration conduits 520 along a bottom surface of the container 500, which can be an open-top roll-off container. For example, the aeration conduits 520 can be assembled and lowered into the container 500. In various instances, the multiple segments and couplings of the aeration conduit 520 can be pre-assembled. For example, the first three segments 524*a*, 524*b*, and 524*c* can be connected and glued at the respective connections. Similarly, the last three segments 524*d*, 524*e*, and 524*f* can be connected and glued at the respective connections. In such instances, sub-assemblies can be easily transported. For example, sub-assemblies spanning approximately 10 feet or less can be easily transported by pick-up truck. In other instances, sub-assemblies may not be pre-formed and/or glued between the various components of the aeration conduits 520 that may not be used. The various subassemblies can be modular components that can be assembled and disassembled to form different aeration conduits and/or aeration conduits of different lengths, for example.

A delivery conduit 530 can be fluidically coupled to each aeration distributor 520 at an elbow joint 528. For example, an elbow joint 528 can extend from the proximal end 519 of the aeration conduits 520. The elbow joint 528 includes two 45-degree fittings 528*a*, 528*b* and a sacrificial sleeve 529 therebetween. In various instances, the first 45-degree fitting 528*a* can be secured to the delivery conduit 530 with adhesive and the second 45 degree fitting 528*b* can be secured to the aeration conduit 520 with adhesive. The sacrificial sleeve 529 can secure the two 45-degree fittings 528*a*, 528*b* together without glue. For example, a clearance fitting in the elbow joint 528 can releasably secure the delivery conduit 530 to the aeration conduits 520. In such instances, the sacrificial sleeve 529 can facilitate separation of the delivery conduits 530 from the aeration conduits 520. The delivery conduit(s) 530 can be fluidically coupled a blower, such as the blower 136 (FIGS. 1 and 2). The weight of the aeration conduits 520 can hold the aeration conduits 520 in place in the container 500.

The composting method can also include loading raw material into the open-top roll-off container 500 to cover the aeration conduits 520 and a portion of the delivery conduits 530 installed therein. Thereafter, air can be provided from the blower, to the delivery conduits 530, and to the aeration conduits 520 during a composting cycle, which can encourage the composting of the raw material. The compost can subsequently be unloaded from the open-top roll-off container.

In various instances, before unloading the compost from the open-top roll-off container, the composting system 501 can be disassembled. For example, the kit components of the composting system 501 can be removed from the container 500. In various instances, the delivery conduit 530 can be withdrawn from the container 500 along an upright axis UA that is collinear with the delivery conduit 530 through the open-top of the roll-off container 500. For example, the delivery conduit 530 can be releasably coupled to the aeration conduit 520 and can be separated at the sacrificial sleeve 529, which may remain in the container 500 with the compost. Additionally, the aeration conduit 520 can be withdrawn along an aeration axis AA that is collinear with the aeration conduit 520 through the door of the open-top roll-off container 500. The aeration axis AA traverses the upright axis UA. In FIG. 6, the aeration axis AA is perpendicular, or substantially perpendicular (e.g. between 80 degrees and 100 degrees), to the upright axis UA. For example, the aeration axis AA can be oriented horizontally, or substantially horizontally, and the upright axis UA can be oriented vertically, or substantially vertically.

To withdraw the delivery conduit 530 and/or the aeration conduit 520, a retraction system can be utilized. For example, the free end 550 of the cable 546 can be secured to a tractor or other vehicle and pulled to compress the aeration conduit 520 and pull the aeration conduit 520 through an open door of the container 500. In various instances, the delivery conduit 530 can also include a retraction system including a cable 536 that can be anchored to the embedded end of the delivery conduit 530 with a metal bar, post, fastener, or spike, for example. For example, retraction systems can further include a coupler for distributing a compressive load in the aeration conduit 520 during extraction, as further described herein.

Referring now to FIG. 7, another composting system 901 is shown. The composting system 901 includes an open-top roll-off container 900. The container 900 can be similar to the containers 600, 700, and 800 (FIGS. 9-11), for example. Exemplary containers are also depicted in FIGS. 1, 2, and 6, for example. A composting kit is assembled and installed in the container 900. For example, the composting kit can include one or more aeration conduits, such as the conduits 520 (FIGS. 5 and 6), the aeration distributors 120 (FIG. 1), or the aeration distributors 420 (FIGS. 3 and 4), for example, and can further include one or more delivery conduits, such as the upright pipes 130 (FIG. 1), the upright pipes 430 (FIG. 4), and the delivery conduits 530 (FIGS. 5 and 6). A manifold 932 fluidically couples a blower 936 to the delivery conduits at releasable elbow joints.

The composting system 901 also includes a cover or roof 960. During a composting cycle, water droplets or condensation can form on the inside surface of the roof 960. The surface tension of the condensation and the slanted profile of the inside surface of the roof 960 can direct the condensation to "roll" toward the edges of the roof 960. The edges of the roof 960 are configured to overhang the perimeter of the container 900 such that the condensation is discharged beyond the perimeter of the container 900. In other words, the roof 960 can provide an escape path for air and water.

The roof 960 includes a frame 964, which rests on the top edge 923 of the container 900 without modifying the container 900. For example, the frame 964 can be constructed from three-quarter inch PVC water pipes and molded fittings at the roof ridge. A lower portion of the frame 964 can fit into wood blocks that have an embedded bar or spike (e.g. reinforcement bar) extending therefrom. Bungee cords 966 can further secure the frame 964 of the roof 960 to the container 900. Similar to the roof 160, a tarp can be positioned over the frame 964.

A blower 936 and a control box 990 are both supported on a bracket 992 that sits by gravity on the edge 923 of the container 900. The bracket 992 can be constructed from plywood, for example. The bracket 992 includes a T-shaped body—the blower 936 is secured to the horizontal member of the T-shaped body, and the control box 990 is secured to the vertical member of the T-shaped body. The bracket 992 can also include a hook from the horizontal member that engages an inside surface of the container 900. In certain instances, the blower 936 and the control box 990 could be on two separate brackets. In other instances, the blower 936 and/or the control box 990 can be directly supported by and/or mounted to the manifold 932, such as the vertical manifold conduit, for example. The blower 936 can be similar to the blower 136 (FIGS. 1 and 2) in many respects, and the control box 990 can be similar to the control panel 190 (FIG. 2) in many respects.

The composting system 901 can be disassembled in about 15 minutes by a single person. For example, the roof 960 and the bracket 992 can be removed from the container 900. In removing the bracket 992, the blower 936 can be decoupled from the delivery conduit(s). Thereafter, the delivery conduit (s) can be withdrawn vertically through the open top of the container 900. The door of the container 900, which is positioned on the far/distal side from the blower 936, can be opened to expose the distal end of the aeration conduit(s). The aeration conduits can be withdrawn horizontally through the open door of the container 900. The result of this disassembly is the roll-off container 900 filled with compost but otherwise unmodified and ready for movement by a commercial waste hauler, for example.

In certain instances, it is desirable to minimize the negative value of raw, compostable material, such as manure, for example, while maximizing the positive value derivable from such material. Using unmodified standard containers, such as roll-off waste containers and/or open-topped shipping containers, for composting such material can provide a cost-efficient option that is scalable for entities of different sizes. For example, an open-top roll-off container is a relatively low-cost composting vessel that is commercially-available in many communities. Additionally, open-top roll-off container provide flexibility with respect to size, placement and investment (i.e. purchasing and leasing can be available). Open-top roll-off containers further utilize industry standard roll-off container vehicles for facilitating handling, transportation and/or delivery of raw material and/or compost. Additional advantages from using unmodified standard containers are further described in U.S. Pat. No. 11,111,188, titled CONTAINER-BASED COMPOSTING, which issued Sep. 7, 2021.

Figure 8:
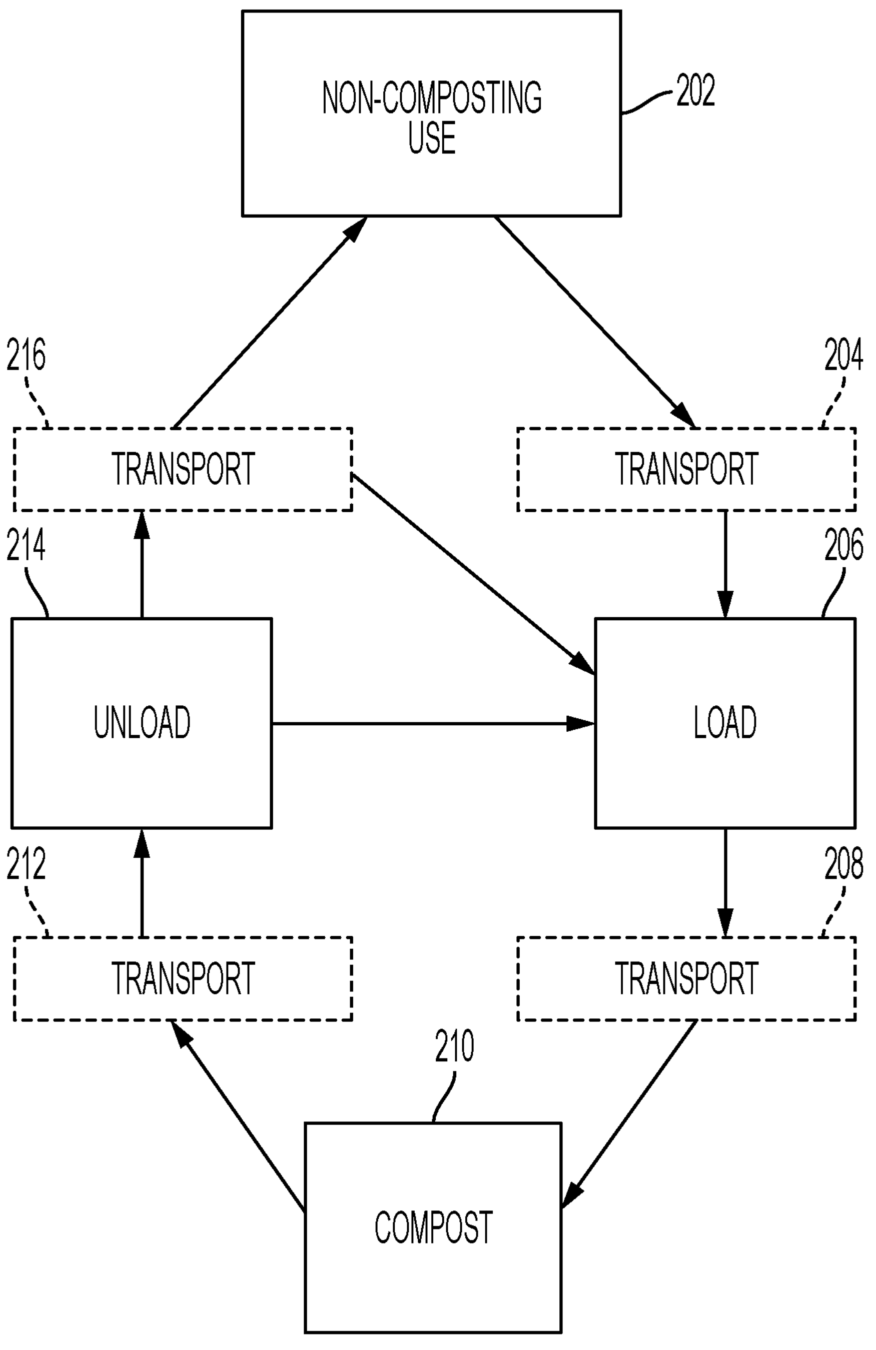
FIG. 8 is a flowchart depicting composting cycles for a composting system, according to various aspects of the present disclosure.

Referring primarily to FIG. 8, a flowchart depicting exemplary composting sequences is depicted. Initially, the container for a composting system, such as the composting system 101 (FIG. 1), the composting system 301 (FIG. 2), the composting system 401 (FIG. 4), the composting system 501 (FIG. 6), and the composting system 901 (FIG. 7), for example, can be engaged in a non-composting use at block 202. The container can then be repurposed for composting. For example, the container can be loaded with the additional components of the composting system and with raw material at block 206. Optionally, the container can be relocated at block 204. For example, the container alone or the container in combination with the additional components for the composting system can be leased from a lessor and delivered to the lessee. After the container is loaded at block 206, the composting cycle can be completed at block 210. Optionally, the container can be relocated at block 208 between loading and composting. For example, the container can be transported to a different location on the lessee's property, the lessor's property and/or a third party's property. Upon completion of the composting cycle, the container can be unloaded at block 214. In certain instances, the compost can be unloaded. Additionally or alternatively, the components of the composting system (e.g. the aeration distributors) can be unloaded. If the container is being returned to a non-composting use at step 202, the additional components should be removed therefrom. Alternatively, if the container is ready for receipt of additional raw material, the additional components may remain in the container and it can again be loaded with raw material at step 206. Optionally, the container can be relocated at block 212 between composting and unloading. For example, the composted material can be sold to a third party and/or returned to the lessor within the container at block 212. After the container is unloaded, it can be transported at block 216 to a new site (e.g. a new lessee) at block 206 and/or to a non-composting use at block 202.

The reader will appreciate that the flowchart described above with respect to FIG. 8 can apply to multiple containers and different sized containers. The container is filled with raw material at block 206 and transformed compost is unloaded at step 214. A lessor of the container and/or composting system can then distribute the composted material and relocate the container to minimize expenses and maximize profits. For example, the composted material can easily be transported to regions having a high demand for compost before it is relocated or delivered to another lessee. In various instances, composting at step 210 can occur during a portion of a transportation route to maximize use of the container during the composting cycle. In such instances, the container can serve dual purposes as a composting vessel and shipping or transportation container.

Retraction Systems

In various aspects of the present disclosure, an alternative retraction system can be utilized. For example, the retraction system can be utilized to disassemble the various composting kits described herein from within the container upon completion of an in-vessel composting cycle. In various instances, the retraction system can be utilized to extract one or more aeration conduits from a container when the container is at least partially filled with material (e.g. compost). The aeration conduit(s) can be extracted without requiring the material to be unloaded from the container. Extraction of the aeration conduit(s) or other components of the composting kit while the container is at least partially filled with material can provide one or more advantages in certain instances. Aeration conduits include perforations or spargers, which provide an outlet for fluid pumped or blown into the container by the composting system's fan or blower.

For example, the aeration conduits can be a significant portion of the overall material cost of the complete compositing kit. Reuse of the aeration conduits, as well as the reuse of other components, favorably impacts the overall economics of the composting equipment and/or process. Composting can add value to a waste stream, however, the cost of creating the compost should be minimized in various instances, so as to not exceed the value of the finished compost. In various instances, the cost to compost material should be less than the value gained so to accrue financial gains to the user of the composting method. Financial gain can be greater when the composting components are more durable and/or reusable.

Additionally or alternatively, if the conduits are not extracted, the conduits are more likely to be damaged or destroyed at the completion of the composting cycle when the compost is dumped from the container or dug from the container (e.g. with a tractor's bucket). Extractability facilitates reuse of these components.

Additionally or alternatively, containers like shipping container and dumpsters are generally mobile, and this mobility when used as a composter adds value in several ways. However, in certain instances it is desirable at the end of the active composting period (e.g. approximately 30 days) to extract and reuse the aeration pipes for another batch of compostable material even if the loaded container if left filled with, or partially filled with, compost, so to cure the freshly-completed compost in place, or to permit the entire load of composts to be delivered to another physical location and dumped (e.g. the container being "tipped" at the new location and all the contents sliding out in one smooth flow as is common in unloading dumpsters, for example, when used for waste hauling).

Additionally or alternatively, the containers can be unaltered by the composting/aeration equipment, and these containers can return to other uses in the waste hauling industry in certain instances, as further described in U.S. Pat. No. 11,111,188, entitled CONTAINER-BASED COMPOSTING, which issued Sep. 7, 2022. Reuse of the containers is further facilitated by having the aeration pipes be extractable from the containers without emptying the composted material. For example, at the end of a composting session, the last batch of compost might be scheduled for delivery. In that case, once thermophilic composting is done, the door can be opened and the aeration conduits can be extracted. Then, the door can be closed and a waste hauler with an appropriate truck can be scheduled to pick-up the container (e.g. a dumpster), drive it to its destination for this load, tip and dump the load, and then continue on with the empty container to a waste hauling task for the container.

Significant forces can be required to extract the aeration conduits from a container of material. Existing solutions often resulted in cracking or damaging the aeration conduits during the extraction process. In certain instances, damaged aeration conduits could not easily be removed from loaded containers and, thus, emptying of the contents would be required to extract the damaged aeration conduits. Moreover, damaged aeration conduits require replacement or repair, which decreases the economic return on the composting method.

Aeration conduits can include perforations along the length thereof, as further described herein, which are dimensioned to provide air and/or moisture into the surrounding raw material in the container. The aeration conduits can be comprised of various materials that are sufficiently strong and durable and with an attachment point at the exposed end to be dragged out of the loaded container (e.g. with a tractor). For example, the aeration conduits can be composed of metal. In various instances, stainless steel can be utilized to ensure durability in the corrosive composting environment. However, metal aeration conduits (e.g. stainless steel) can add significant weight to the kit, which is problematic for delivery and handling considerations, and are also associated with a higher cost.

Instead of metal aeration conduits, the conduits can be comprised of plastic, which can be lighter and more economical in various instances. For example, the aeration conduits can be formed from commercial polyvinyl chloride (PVC) and/or acrylonitrile butadiene styrene (ABS) drainpipes for aeration, which can be more affordable and lightweight than metal drainpipes, while still resisting corrosion. However, PVC and ABS conduits are generally not designed for longitudinal extraction (i.e. to be pulled or pushed from one end) and, thus, do not include an integral attachment point for extraction longitudinally.

The couplers described herein can provide an attachment point for the plastic aeration conduits and improve the force distribution during extraction to prevent cracking or otherwise damaging of the conduits.

PVC and ABS materials are generally stronger in compression than in tension (e.g. can be approximately 30 to 40 percent stronger in compression than in tension). The couplers can be positioned at the far (e.g. distal) end of the aeration conduits, so that the extraction force is applied in the direction of compression of the aeration pipes. A cable extending inside the aeration pipe is secured to the couplers at the far end. Upon pulling the proximal end of the cable, the tension in the cable is transmitted to a compressive force in the aeration conduit. In various instances, the cables can be steel cables that are designed for tension loads. In these instances, the retraction system utilizes steel cables to their strength (i.e. in tension) and plastic aeration conduits to their strength (i.e. in compression). This combination allows the least sized of both items to carry the load of extraction and, therefore, can provide an economic advantage in various instances.

In various instances, the aeration conduits can be assembled from a series of conduit sections, as further described herein. The aeration conduits can be assembled with a simple interference fit, such as a "slip-fit" that is left unglued, for example. The interference fit connection can permits a long assembly of aeration conduit segments to be disassembled for ease of shipment and handling. Additionally or alternatively, one or more of the segments can be replaceable, as necessary, during the lifespan of the composting kit, instead of requiring the entire assembly to be replaced.

Similarly, the coupler at the distal end of the aeration conduits may not be glued or permanently fixed to the adjacent end of the aeration pipe. When the cable is drawn into tension (e.g. by a tractor pulling the proximal end of the cable), the slip-fit connections simply slip until their travel limits are reached. Then, the tension in the cable is transmitted to the coupler, which applies a compression load on the coupler and the aeration conduits in the direction of the extraction.

In various instances, a significant portion of the resistance to extraction of the aeration conduits is due to the vertical weight of the compost. For example, the compost loaded in the container can have a bulk density of 60-70 pounds per cubic foot, which is exerted upon an outside surface of the aeration conduits, and which presses these conduits again the floor of the container. This force can make extraction of a filled, or partially-filled, container more difficult, and can increase the risk of damaging the composting kit components during extraction.

Figure 12:
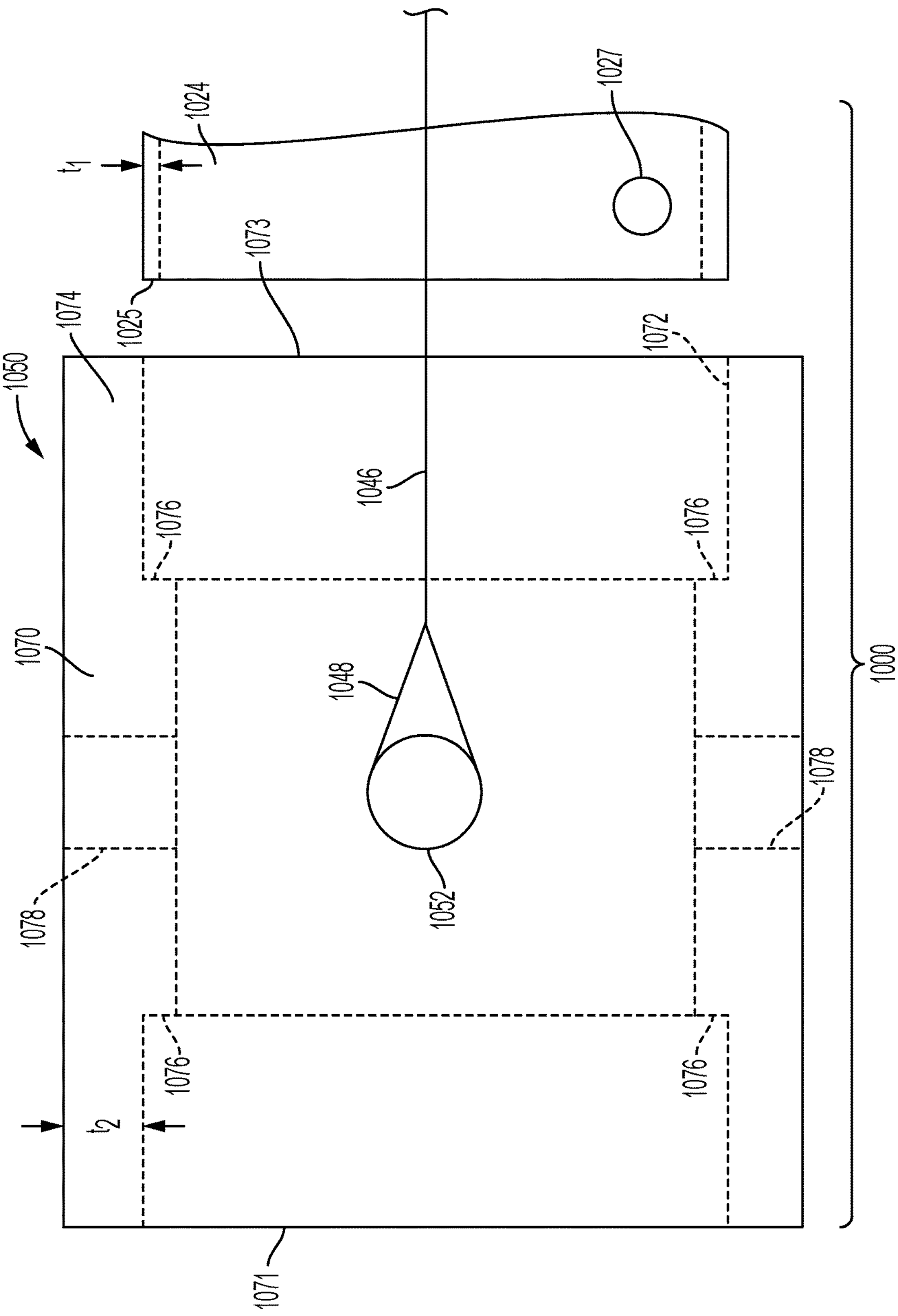
FIG. 12 is an exploded view of a retraction system including a coupler and an end portion of an aeration conduit, according to various aspects of the present disclosure.
Figure 13:
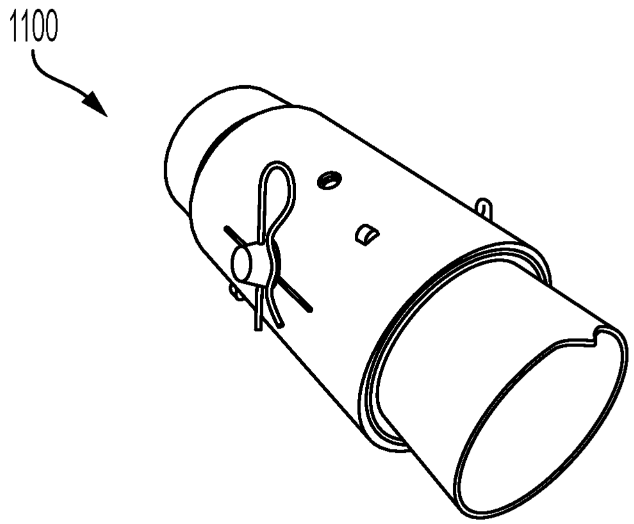
FIGS. 13-20 are photographs of retraction systems and components thereof, according to various aspects of the present disclosure.
Figure 14:
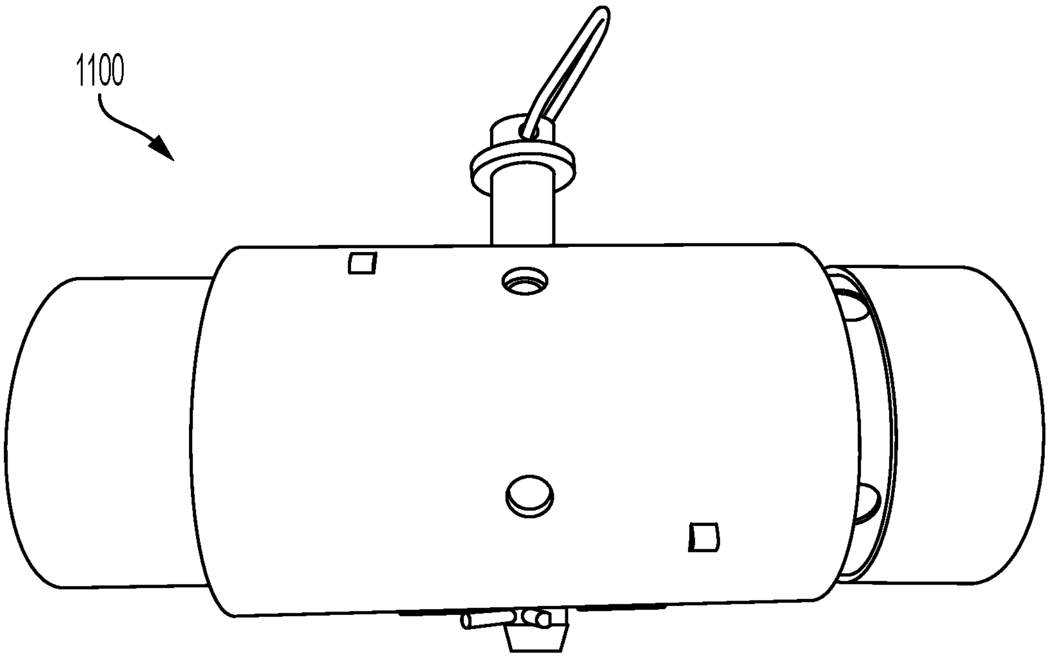
Figure 15:
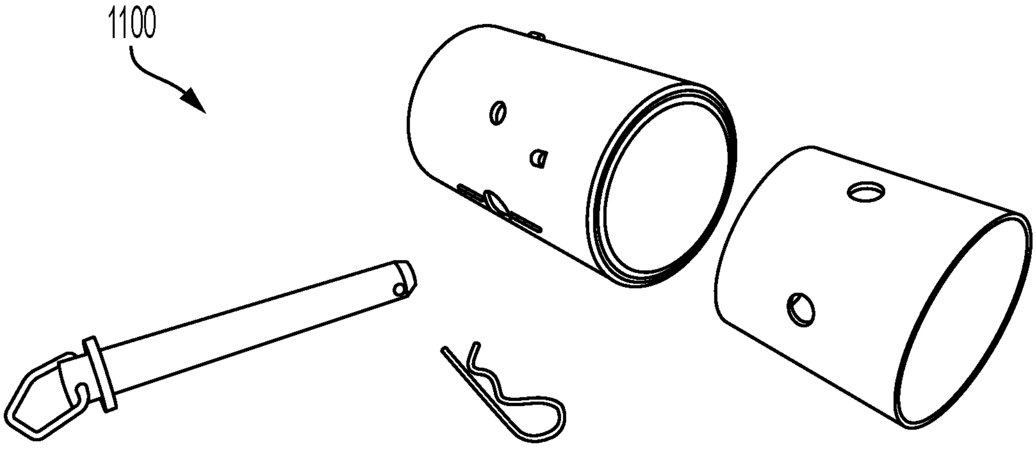
Figure 16:
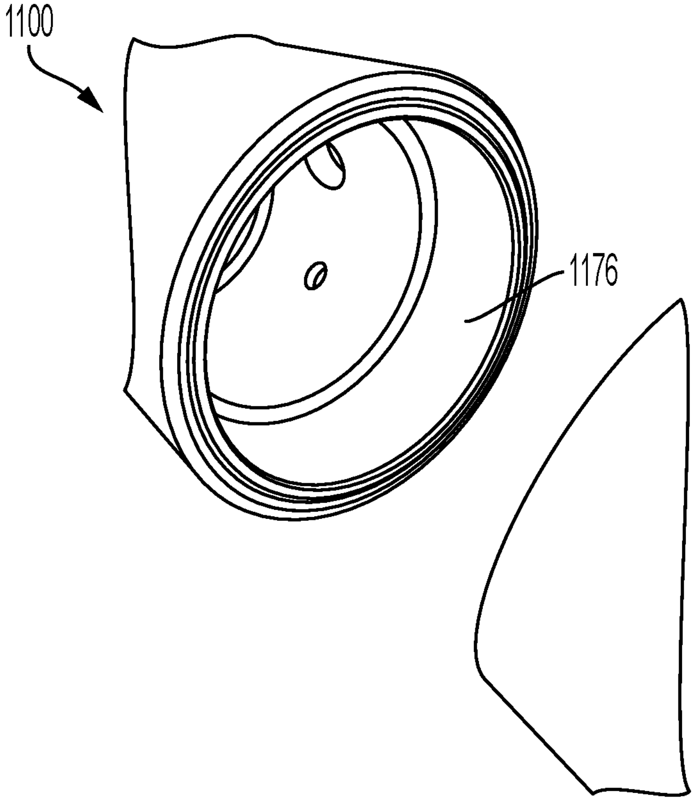
Figure 17:
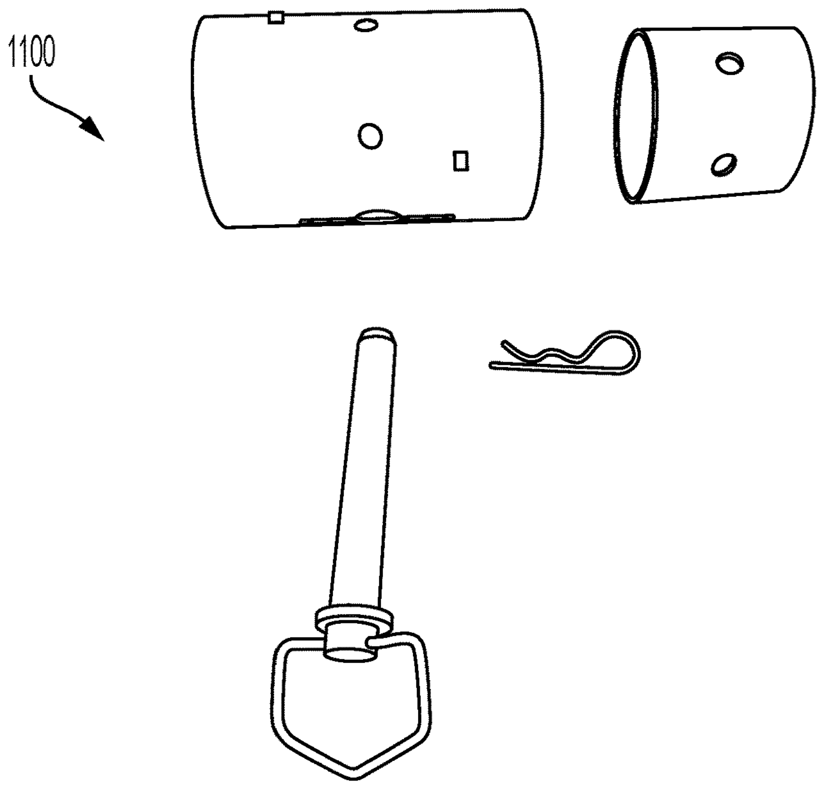
Figure 18:
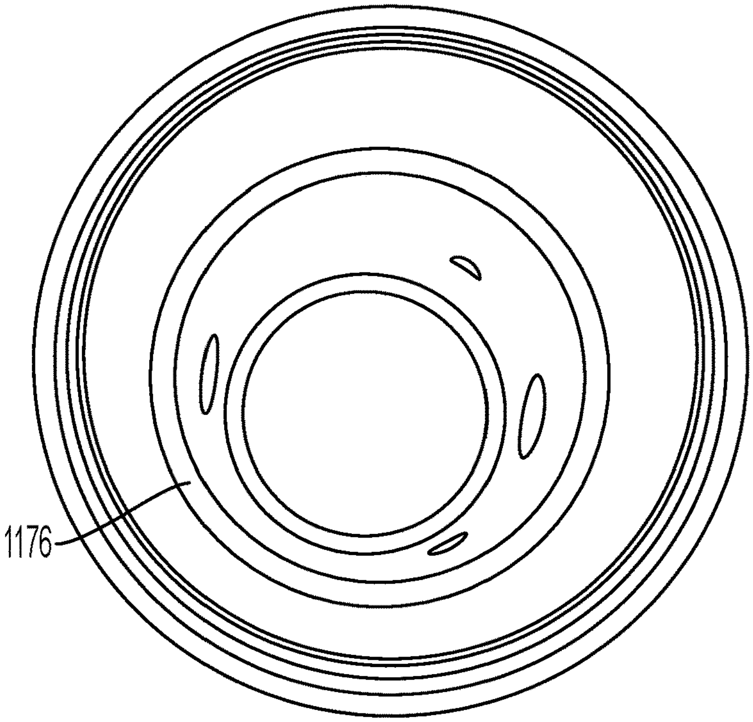

Referring now to FIG. 12, portions of a retraction assembly 1000 are shown. The portions includes a retraction coupler 1050 and portion of a pipe 1024. The pipe 1024 can be similar to inner tube 124 and aeration conduit 524, for example, which are further described herein. The pipe 1024 includes an annular face 1025 facing the coupler 1050. The retraction coupler 1050 includes a body portion 1070 defining a tubular shape and having a central through-hole 1072 defined through the body portion 1070 from a first end 1071 (e.g. a distal end) 1071 to a second end 1073 (e.g. a proximal end). The coupler 1050 includes a stepped wall 1074 forming the outside surface of the body portion 1070 and the inside surface along the central through-hole 1072. The stepped wall 1074 defines a variable thickness t2 of the body portion 1070 along the length of the coupler 1050. A step of the stepped wall 1074 forms an annular shoulder 1076 within the coupler 1050. The annular shoulder 1076 of the coupler 1050 is configured to abut the annular face 1025 of the conduit 1024 when the end portion of the conduit 1024 is received within the central through-hole 1072 of the coupler 1050.

The wall of the conduit 1024 also defines a thickness t1. The thickness t1 of the conduit wall 1024 is less than the minimum variable thickness t2 of the coupler 1050. The additional thickness of the coupler 1050 can increase the resiliency of the coupler 1050. Moreover, the variable thickness t2 can be selected to ensure the entire annular face 1025 matingly engages and abuts the annular shoulder 1076 to sufficiently transfer the force around the annular face 1025 to evenly distribute the forces. For example, the annular shoulder 1076 has a height that is greater than the thickness t1 of the conduit 1024. In various instances, the height of the annular shoulder 1076 can be more than twice the thickness t1 of the conduit.

The retraction assembly 1000 also includes a cable 1046 that extends through the aeration conduit 1024 from a proximal end (not shown in FIG. 12) to a distal end of the aeration conduit 1024. The cable 1046 can be a quarter-inch diameter steel cable, for example. The cable 146 includes a fixed loop or eyelet 548, which is anchored to the coupler 1050 by a bar or hitch pin 1052 (e.g. a steel pin secured with a locking member). The eyelet 548 can comprise a thimble around which the cable 1046 is spliced, and the pin 1052 can be secured within the thimble, for example. Application of a pulling force on the proximal end of the cable 1046 is configured to pull the annular shoulder 1076 facing the conduit 1024 into abutting engagement with the annular face 1025 of the conduit 1024 to distribute a compressive force along the annular face 1025.

As shown in FIG. 12, the through-hole 1072 in the coupler 1050 permits airflow from the conduit 1024 to be expelled from the conduit 1024. For example, the air can flow out of the distal end 1071 of the coupler 1050. Additionally or alternatively, the coupler 1050 can include additional perforations 1078 through the stepped wall 1074 to provide additional outlets or aeration holes for the fluid provided to the conduits 1024 during a composting cycle, for example.

The coupler 1050 can be comprised of plastic, such as PVC, ABS, or a combination thereof, for example.

In various instances, the tension force of the extraction cable 1046 creates a shear-force on the pin 1048, which is then transmitted via the two passage holes in the body portion 1070, which are similar to the perforations 1078, but 90-degrees offset from the perforations 1078. These two points, which are oriented 180 degrees apart around the circumference of the coupler 1050 where the pin 1048 passes through the stepped wall 1074 of the coupler 1050, permit the force in the coupler 1050 to be supplied at the maximum thickness of the variable thickness t2 wall 1074. The force is transmitted radially to the full cross-sectional face 1025 (360-degree) of the aeration conduit 1024.

The shear force flows radially to the entire 360-degree shoulder and to a compressive force in the aeration conduit 1024 that has an interference fit to the coupler 1050. In these instances, all plastic parts (e.g. conduit 1024 and coupler 1050) are in compression.

Retraction system couplers, such as the coupler 1050, for example, for aeration conduits can be manufactured in a number of ways. In various instances, the couplers can be molded as a single monolithic component. For example, the coupler can be injected molded from a plastic material, such as ABS, for example. Molding the couplers can reduce the amount of labor and total material requirements for manufacturing the couplers. In other instances, the couplers can be assembled from multiple components that are secured together (e.g. glued). Holes can be drilled into the couplers for accepting the hitch-pin and/or including aeration holes/perforation, as well. The couplers can be manufactured in suitable sizes to fit the diameter of the aeration conduits.

The retraction system described herein can be used for conduits having other purposes than composting kits. In various instances, the retraction system can be utilized to retract non-perforated conduits. In addition to PCV an ABS, alternative materials for the coupler are also contemplated. The appropriate material can be selected based on evaluating the application of the coupler and conduit.

A composting system can include a typical waste disposal dumpster. Such dumpsters are generally a maximum of 22-foot in length, a fixed width of nominally eight feet, a variable height up to 8-feet, and a usual maximum volume of 40 cubic yards (i.e. a 40-yard dumpster). Testing has confirmed that in these instances, it is possible to extract at least 22-feet of 4-inch diameter perforated PVC pipe buried in a 40-yard dumpster filled with composted material by using a single coupler at the distal end of the pipe and a cable from a distal coupler mounted to the 22-foot PVC perforated conduit extending slightly beyond the proximal end of the 22-foot conduit.

Another commercially-available vessel to use for composting is the usual shipping container for principally international ocean cargo shipments. These could be in several configurations, which are either 20-foot in length or 40-foot in length and with open tops.

In certain instances, the retraction system can include multiple couplers. For example, the retraction system can include two couplers, one at the furthest, distal end of the conduit, and another at or near the mid-point. These two sections of the aeration conduit can be extracted simultaneously by two cables, one from each thrust-coupler and both ending at a common pulling point. In other instances, the retraction system can include a single cable having three or more eyelets. For example, two eyelets of the cable can be fixed to the couplers, and another eyelet can be the single pulling point for the retraction system. The pulling point is a loop of cable at the proximal end, for example.

In various instances, the multi-coupled system (e.g. a double coupler system described herein) can be utilized for larger containers and greater volume composting system. For example, the double couplers can be used with the 40-foot long ocean shipping containers, which can be greater than eighty cubic yards in volume.

Figure 25:
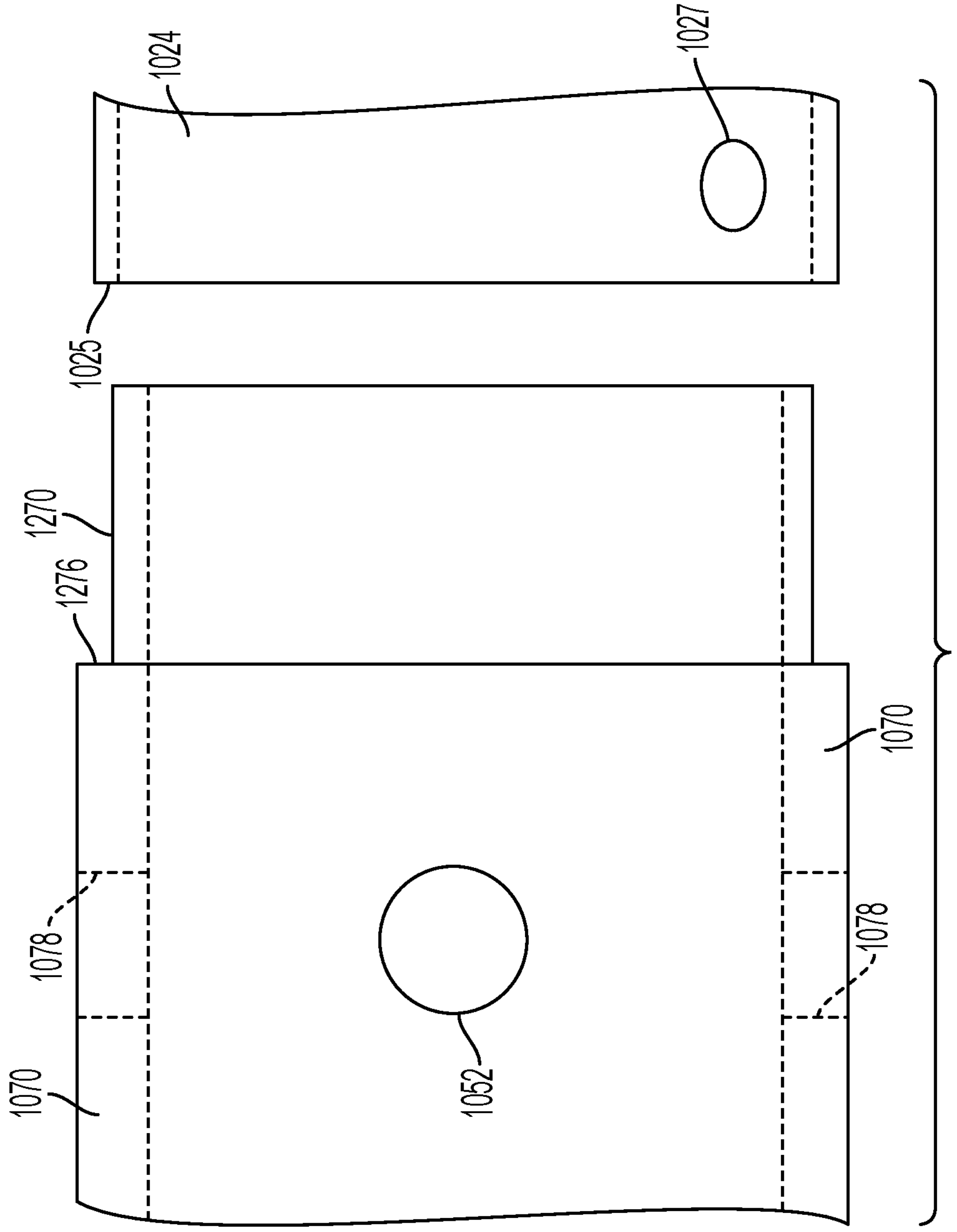
FIG. 25 is an exploded view of a retraction system including a portion of a coupler and an end portion of an aeration conduit, according to various aspects of the present disclosure.

Referring again to FIG. 12, the aeration conduit 1024 is positioned within the through-hole 1072 in the coupler 1050 such that the annular face 1025 of the conduit 1024 abuts the annular shoulder 1076 of the coupler 1050. In other instances, an extended portion of the coupler 1050 can extend into the central channel of the aeration conduit 1024 and the annular face 1025 of the aeration conduit 1924 can abut an external-facing annular shoulder 1276 of the coupler at the transition between the body portion 1070 of the coupler 1050 and the extended portion 1270. An exemplary embodiment depicting an extended portion 1270 for a retraction system is shown in FIG. 25. The retraction system in FIG. 25 is similar in many aspects to the retraction system 1000 in FIG. 12, however, the extended portion 1270 of the coupler extends into the aeration conduit 1024. In such instances, as further described herein with respect to FIG. 12, a retraction force applied to the coupler can shift the coupler into abutting engagement with the aeration conduit and the retraction force can exert a compressive force by the annular shoulder 1276 to the annular face 1025 around the entire circumference of the annular face 1025 to compress the conduit 1024 during the extraction motion.

In various instances, a retraction assembly can include a cable configured to extend through the aeration conduit (e.g. through several segments of conduit) from the door-side of the container to a cap at the far-side of the container and distal end of the aeration conduit. The cable can extend through a hole in the cap. In various instances, a hitch pin can be connected to the cable distal to the cap. For example, the eye or thimble of the cable can be coupled to the hitch pin. In such instances, a portion of the body of the cap is configured to form an abutment face that engages the aeration pipe and exerts a retraction force thereon to remove the aeration conduit from the container.

Referring now to FIGS. 13-18, photographs of a retraction assembly 1100 and components thereof are depicted for illustrative purposes. The retraction assembly 1100 can include a coupler like the coupler 1050, in various instances, an aeration conduit like the aeration conduit 1024, in certain instances, and a hitch-pin assembly like the pin 1052, in one or more instances. The retraction assembly 1100 further includes an annular shoulder 1176, which applies a compressive force to the aeration conduit during extraction, as further described with respect to annular shoulder 1076, for example.

Figure 19:
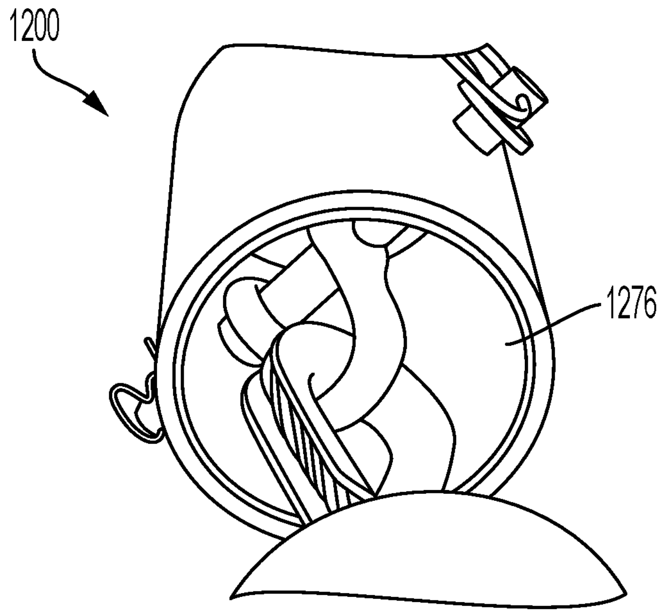
Figure 20:
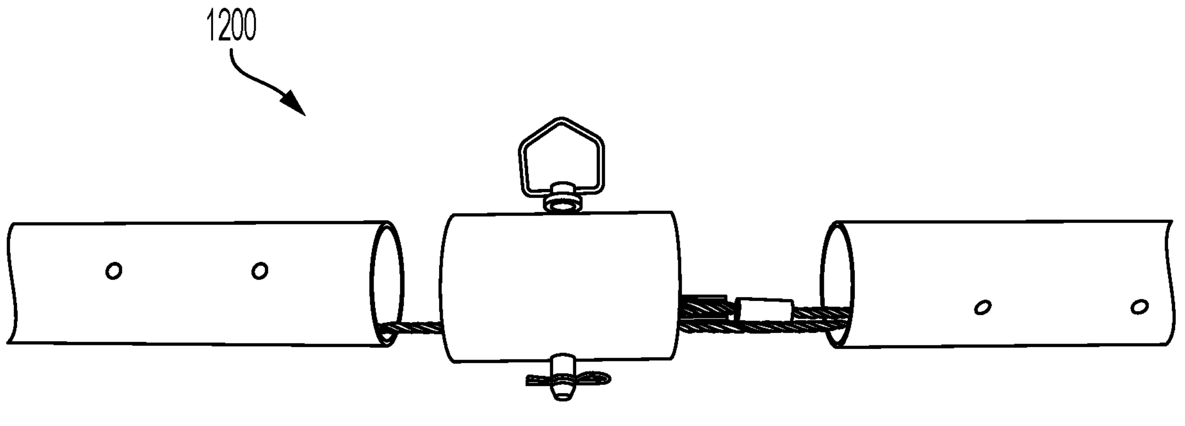

Referring now to FIGS. 19 and 20, photographs of a retraction assembly 1200 and components thereof are depicted for illustrative purposes. The retraction assembly 1200 can include a coupler like the coupler 1050, in various instances, an aeration conduit like the aeration conduit 1024, in certain instances, and a hitch-pin assembly like the pin 1052, in one or more instances. The retraction assembly 1200 further includes an annular shoulder 1276, which applies a compressive force to the aeration conduit during extraction, as further described with respect to annular shoulder 1076, for example.

Pre-Heating

As further described herein and in U.S. Pat. No. 11,111,188 titled CONTAINER-BASED COMPOSTING, which issued Sep. 7, 2021, in-vessel or container-based forced aeration composting utilizes ambient air for the periodic dosing of oxygen into material during a composting cycle. The ambient air is a lower temperature than the targeted thermophilic composting temperature, which is generally between 131 degrees F. and 160 degrees F. This ambient air encourages active composting, and its lower temperature can be helpful to regulate the composting vessel's temperature. For example, without the dosing of cooler air for temperature control, the internal composter temperature may peak in an excessively elevated temperature zone, which causes the census of microbes to collapse resulting in a sharp decline to the composting process. This can lead to a "whipsawing" effect and can slow down the composting process.

The dosing of a periodic volume of air from a blower with paused periods of no dosing generally leads to a good composting outcome as there are healthy aerobic conditions then in the mass of material. The blowers "on" periods and "off" periods can be adjusted. For example, the "on" duty cycle can be a small fraction of the "off" duty cycle. More specifically, the "on" duty cycle can be 20 seconds, while the "off" duty cycle can be 20 minutes. In various instances, the composting cycle can include up to 1 to 3 percent on-duty cycle and a 97 to 99 percent off-duty cycle. In certain instances, if the selected duty cycle leads to a composter system's excessive temperature being reached, a maximum temperate control relay can switch on the blower to run continuously until the composter internal temperature is reduced to within the ideal range. When the blower runs continuously to reduce the temperature below the composter's excessive temperature threshold, the ambient air acts as a cooling agent.

Figure 23:
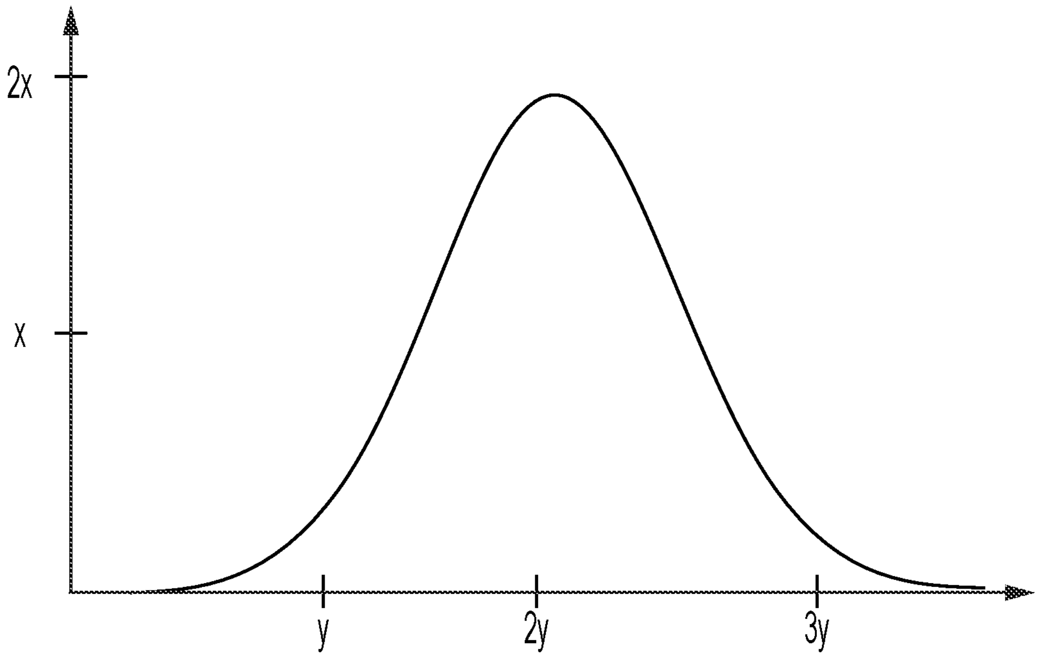
FIG. 23 is a graphical representation of temperature gradients along a y-axis in a container during an in-vessel composting cycle, according to various aspects of the present disclosure.
Figure 24:
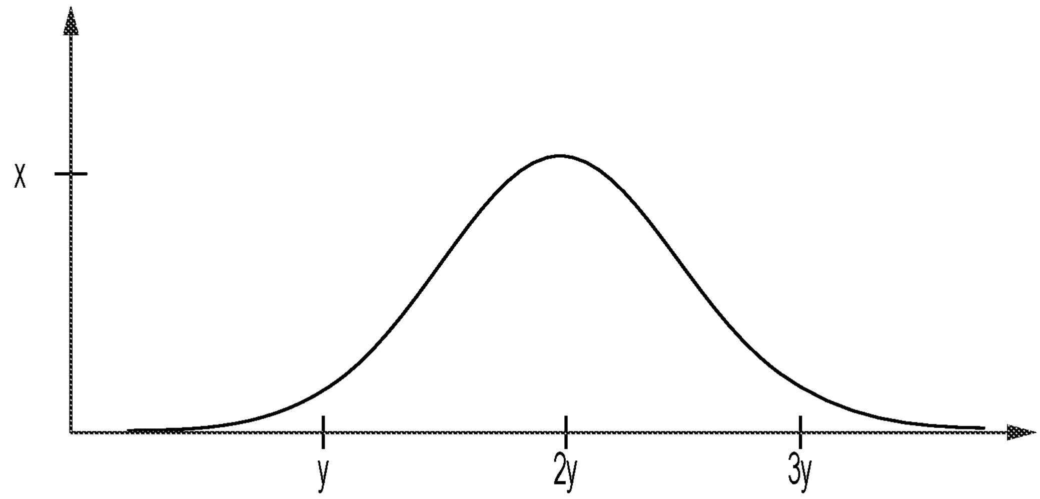
FIG. 24 is a graphical representation of temperature gradients along a y-axis in a container during an in-vessel composting cycle, according to various aspects of the present disclosure.

The above-provided description can apply to managing an average internal temperature within the container for in-vessel composting, for example. However, the actual internal temperature, at any one point in within the container, can deviate from the average temperature. Within the container, the material will be subject to a temperature gradient ranging from a higher temperature to a lower temperature. Higher temperatures typically arise near the center of the container and mass of material, while lower temperatures generally extend around the perimeter. A temperature range from 130 degrees F. to 160 degrees F. is often considered ideal. 131 degrees F. is an ideal temperature for killing pathogens, rendering weed seeds and fly larvae unviable to reproduce, and thereby assuring the resulting compost is suitable for most consumer purposes. Moreover, 160 degrees F. has been a proposed as an upper limit because above that temperature many helpful microbes are no longer active, which inhibits the composting process. The temperature gradient in an aerated vessel composter arises from several factors. The principal factors are composter geometry (e.g. surface to volume ratio), temperature of the dosed air, surrounding ambient conditions and natural cooling effects (e.g. conduction, convection, and radiation). Many of these factors are outside of the operator's control. For example, in cooler climates during colder seasons, the low ambient temperature can cause various effects. For example, the outside wall surfaces can conduct heat away from the composting materials at the outer edges. Additionally, the dosed air provided by the pump is cooler and, thus, serves to further cool the composting material. In various instances, the colder temperatures can further exasperate the temperature gradient in the composting materials. Conversely, in an ideal situation, the gradient would be minimized and extremely low with a substantially uniform temperature across the volume of material being composted. Referring to FIGS. 23 and 24, temperature gradients along a y-axis within a container during an in-vessel composting cycle are depicted. The y-axis can define the longitudinal axis of the container. In various instances, another temperature gradient can be defined along the lateral axis of the container. Referring to FIG. 23, where the input air from the composting system in not preheat, the temperature gradient is greater within the container. Comparatively, referring to FIG. 24, reheating the input air from the composting system, as further described herein, can reduce the temperature gradient as shown in FIG. 24.

To minimize the temperature gradient, an air storage volume can be installed within the container, and can be surrounded by or substantially embedded within the material to be composted within the container. This air storage volume can be made of non-perforated pipes extending through the container. The non-perforated pipes can be the same or similar in size and/or volume to the aeration conduits and associated manifold, for example. In various instances, the non-perforated pipes can define an air storage volume in the container that forms a loop beginning and ending at the blower. For example, the loop can define an intermediate pathway between the blower and the aeration pipes. In certain instances, such as in cooler climates and/or winter months, the blower for the composting system could be positioned at one end of the container and the non-perforated pipes can extend from the blower to the opposite end of the container. At the opposite end of the container, the air could be supplied to the aeration conduits and delivered into the composting material after it has passed through the length of the composter alone and/or near the geometric center when temperatures are prone to being the highest. In this way, when the blower runs and doses air into the material, the air has been preheated as is moves into and reside in the center, warmer regions in the composted material during the "off" duty cycle, or a portion thereof. The preheated air pushed to the discharge aeration pipes and into the composting mass. By passing through the warmer, center region of the material, the volume of air will have become pre-heated by the composting mass surrounding it during the idle period between dosing, i.e. the "off" duty cycle period. Moreover, cooler air replacing the warned air will lower the core temperature of the composter where temperatures could become higher. The resulting outcome would be a lower temperature gradient across the cross-section of material within the container during a composting cycle.

These non-perforated pipes for pre-heating air supplied to the material within the container use the heat produced as a by-product of the microbial breakdown of organic material during a composting cycle. In various instances, the non-perforated pipes can use one of the retraction systems described herein to extract the non-perforated pipes at the end of the composting cycle. For example, a coupler can be attached to the end of the non-perforated pipe and an annular shoulder/annular face engagement can drive compression of the non-perforated pipe and extraction thereof.

Figure 21:
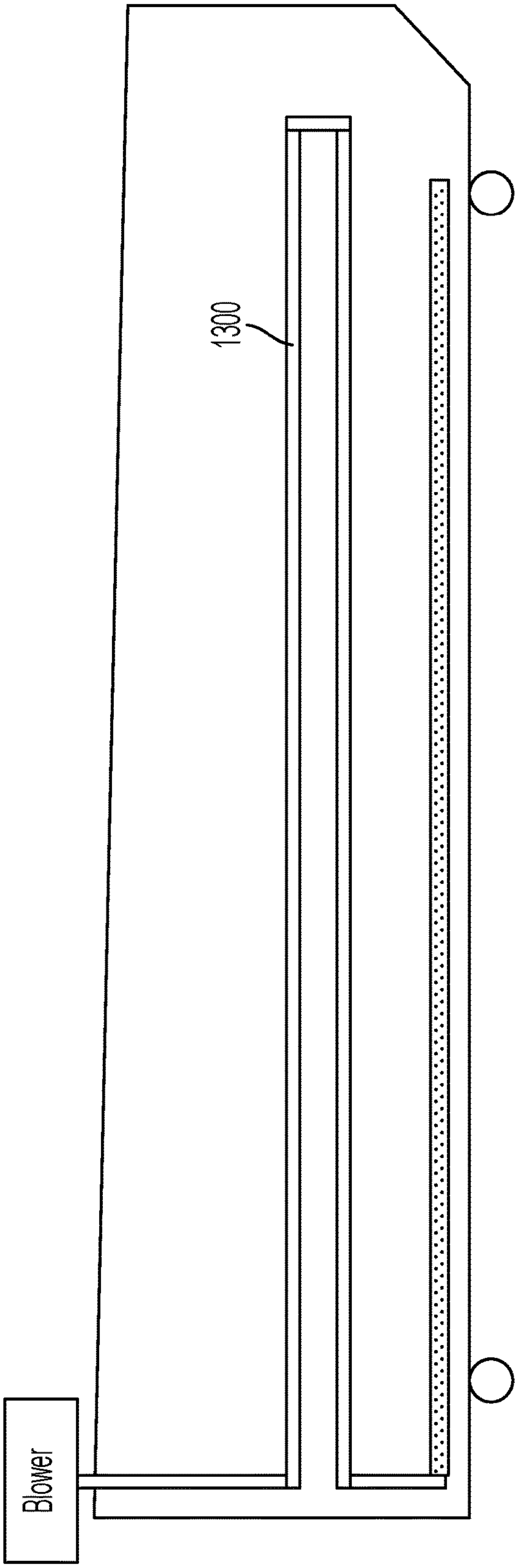
FIG. 21 is a schematic of a preheating system for a container-based composting system, according to various aspects of the present disclosure.

Referring to FIG. 21, a preheating system 1300 for container-based composting is depicted. The preheating system 1300 can be utilized during colder weather and/or winter months. For example, the loop of non-perforated conduit extends from one end of the container (near the blower) to the opposite end of the container and back again to hold a reservoir of air. The end of the non-perforated conduit is coupled to an aeration conduit. The blower provides an initial supply of air to the non-perforated conduit, and the initial supply of air is heated by the internal temperature within the container during the "off" duty cycle. Thereafter, during the "on" duty cycle, the preheated air is blown into the material in regions where the materials is cooler due to the temperature gradient within the material.

Figure 22:
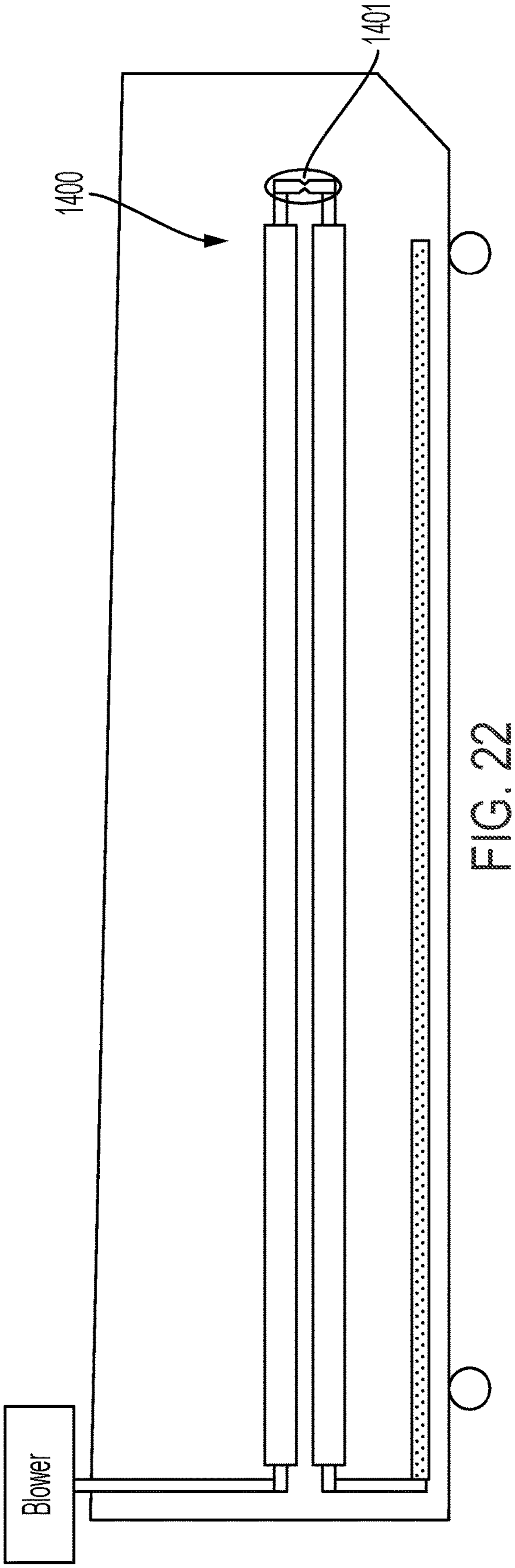
FIG. 22 is a schematic of a preheating system for a container-based composting system, according to various aspects of the present disclosure.

Referring now to FIG. 22, an alternative preheating system 1400 for container-based composting is depicted. The preheating system 1400 can also be utilized during colder weather and/or winter months. For example, the loop of non-perforated conduit extends from one end of the container (near the blower) to the opposite end of the container and back again to hold a reservoir of air. The reservoir can be enlarged by using larger diameter pipes for portions of the preheating system, as shown in FIG. 22. The prehearing system 1400 also includes a restrictive orifice 1401, which can help to limit mixing of the warmed air during the "off" duty cycle. The end of the non-perforated conduit is coupled to an aeration conduit. The blower provides an initial supply of air to the non-perforated conduit, and the initial supply of air is heated by the internal temperature within the container during the "off" duty cycle. Thereafter, during the "on" duty cycle, the preheated air is blown into the material in regions where the materials is cooler due to the temperature gradient within the material.

What is claimed is:

1. A composting kit, comprising:
- a perforated aeration conduit defining a first axis, wherein the perforated aeration conduit comprises a first end, a second end, and a central conduit between the first end and the second end, wherein the perforated aeration conduit comprises an annular face at the second end;
- a delivery conduit fluidically coupled to the first end of the perforated aeration conduit at a releasable joint, wherein the delivery conduit is configured to deliver a fluid to the perforated aeration conduit; and
- a coupler comprising an annular shoulder configured to abut the annular face of the perforated aeration conduit when the second end is installed in the coupler;
- a cable extending through the central conduit of the perforated aeration conduit to the coupler, wherein the cable comprises:
  - a first cable end mounted to the coupler; and
  - a second cable end, wherein application of a pulling force on the second cable end is configured to pull the annular shoulder of the coupler against the annular face of the perforated aeration conduit to distribute a compressive force along the annular face.

2. The composting kit of claim 1, further comprising a container comprising a door and a lower support surface, wherein the perforated aeration conduit extends along the lower support surface.

3. The composting kit of claim 2, wherein application of the pulling force on the first cable end is configured to withdrawal the perforated aeration conduit along a longitudinal axis through the door.

4. The composting kit of claim 3, wherein application of a second pulling force on the delivery conduit is configured to withdraw the delivery conduit along an upright axis, and wherein the upright axis is orthogonal to the longitudinal axis.

5. The composting kit of claim 1, further comprising a blower configured to be fluidically coupled to the delivery conduit, wherein the blower is configured to provide air to the perforated aeration conduit.

6. The composting kit of claim 1, wherein the coupler forms a tubular member comprising a first open end and a second open end opposite the first open end and adapted to receive the second end of the perforated aeration conduit.

7. The composting kit of claim 6, wherein the tubular member further a stepped wall defining the annular shoulder, further comprising perforations through the stepped wall.

8. The composting kit of claim 7, wherein the stepped wall comprises a first maximum width, wherein the second end of the perforated aeration conduit comprises a wall comprising a second maximum width, and wherein the first maximum width is at least double the second maximum width.

9. The composting kit of claim 7, wherein the tubular member further comprises a pair of pin holes adapted to receive a hitch pin.

10. The composting kit of claim 9, wherein the coupler comprises an integrally-molded component.

11. The composting kit of claim 1, wherein the perforated aeration conduit is comprised of plastic, and wherein the cable is comprised of metal.

12. The composting kit of claim 11, wherein the perforated aeration conduit comprises a thermoplastic resin selected from a group consisting of polyvinyl chloride (PVC), acrylonitrile butadiene styrene (ABS), and combinations thereof.

13. The composting kit of claim 1, wherein the perforated aeration conduit comprises a first segment, a second segment, and a second coupler intermediate the first segment and the second segment, wherein the second coupler comprises a second annular shoulder configured to abut a second annular face of the first segment when a portion of the first segment is received in the second coupler, and wherein the composting kit further comprises:

a second cable mounted to the second coupler, wherein application of a pulling force to the second cable is configured to pull the second annular shoulder of the second coupler against the second annular face of the perforated aeration conduit to distribute a compressive force along the second annular face.

* * * * *